(12) United States Patent
Norp et al.

(10) Patent No.: US 11,470,536 B2
(45) Date of Patent: Oct. 11, 2022

(54) MULTI-HOP RELAYING IN A MOBILE COMMUNICATION NETWORK

(71) Applicants: KONINKLIJKE KPN N.V., Rotterdam (NL); NEDERLANDSE ORGANISATIE VOOR TOEGEPAST-NATUURWETEN SCHAPPELIJK ONDERZOEK TNO, s-Gravenhage (NL)

(72) Inventors: Antonius Norp, The Hague (NL); Sander De Kievit, Tokyo (JP); Wieger Ijntema, Rotterdam (NL); Toni Dimitrovski, Boskoop (NL)

(73) Assignees: Koninklijke KPN N.V., Rotterdam (NL); Nederlandse Organisatie Voor Toegepastnatuurwetenschappelijk, 's-Gravenhage (NL)

( * ) Notice: Subject to any disclaimer, the term of this patent is extended or adjusted under 35 U.S.C. 154(b) by 37 days.

(21) Appl. No.: 17/258,639

(22) PCT Filed: Jul. 11, 2019

(86) PCT No.: PCT/EP2019/068646
§ 371 (c)(1),
(2) Date: Jan. 7, 2021

(87) PCT Pub. No.: WO2020/011907
PCT Pub. Date: Jan. 16, 2020

(65) Prior Publication Data
US 2021/0274422 A1    Sep. 2, 2021

(30) Foreign Application Priority Data
Jul. 12, 2018  (EP) .................................... 18183059

(51) Int. Cl.
*H04W 40/22* (2009.01)

(52) U.S. Cl.
CPC .................................. *H04W 40/22* (2013.01)

(58) Field of Classification Search
CPC ...... H04W 40/22; H04W 88/04; H04W 76/14
See application file for complete search history.

(56) References Cited

U.S. PATENT DOCUMENTS

| 8,730,844 B2 | 5/2014 | Johnson et al. |
| 10,531,365 B2 * | 1/2020 | Kaur ..................... H04W 48/10 |

(Continued)

FOREIGN PATENT DOCUMENTS

| EP | 1653676 B1 | 12/2017 |
| EP | 3319393 A1 | 5/2018 |

(Continued)

OTHER PUBLICATIONS

PCT International Search Report and Written Opinion, Application No. PCT/EP2019/068646, dated Jul. 31, 2019, 11 pages.

(Continued)

*Primary Examiner* — Hashim S Bhatti
(74) *Attorney, Agent, or Firm* — McDonnell Boehnen Hulbert & Berghoff LLP

(57) ABSTRACT

A client device (13) is configured to transmit a relay request to a relay device (14). The relay request comprises a first device identifier identifying the client device and one or more first link identifiers identifying one or more links of which at least one links a further device (12) with a network node via the client device. The client device is further configured to receive an acceptance message accepting the relay request from the relay device and transmit data associated with the one or more links to the relay device in dependence on receipt of the acceptance message. The relay device is configured to receive the relay request from the client device, determine whether the relay request can be accepted, associate the first device identifier with each of the (Continued)

first link identifiers, and transmit the acceptance message upon determining that the relay request can be accepted.

16 Claims, 11 Drawing Sheets

(56) References Cited

U.S. PATENT DOCUMENTS

| | | | |
|---|---|---|---|
| 2008/0165776 | A1 | 7/2008 | Tao et al. |
| 2016/0337971 | A1* | 11/2016 | Bhargava .......... H04W 52/0216 |
| 2019/0069247 | A1* | 2/2019 | Wu ...................... H04W 76/15 |

FOREIGN PATENT DOCUMENTS

| | | | |
|---|---|---|---|
| JP | 2018046405 | A | 3/2018 |
| WO | 2008021146 | A2 | 2/2008 |
| WO | 2011153507 | A2 | 12/2011 |
| WO | WO2018041757 | A1 | 3/2018 |
| WO | WO2018083298 | A1 | 5/2018 |
| WO | WO2018083320 | A1 | 5/2018 |
| WO | WO2019121497 | A1 | 6/2019 |
| WO | WO2019122285 | A1 | 6/2019 |

OTHER PUBLICATIONS

"3rd Generation Partnership Project; Technical Specification Group Services and System Aspects; Study on Architecture Enhancements to ProSe UE-to-Network Relay", 3Gpp TR 23.733 V15.1.0 (Dec. 2017).

"Universal Mobile Telecommunications Systems (UMTS); LTE; Proximity-based serviec (ProSe); Stage 2", 3Gpp TS 23.303 version 12.2.0 Release 12 (Sep. 2014).

Japanese Office Action issued in Japanese Application No. 2021-500580, dated Feb. 1, 2022.

George et. al., Protocols for mobility management in heterogeneous multi-hop wireless networks, Pervasive and Mobile Computing 4 (2008) 92-116.

Application Potential of Sensor Network and Ad Hoc Network, downloaded from https://www.zte.com.cn/global/about/magazine/zte-communications/2005/3/en_57/162345.html; Sep. 21, 2005.

Safwat, Ahmed., A-cell: a novel multi-hop architecture for 4G and 4G+ wireless networks, 2003 IEEE.

Shen et. al., Multi-hop relay for next-generation wireless access networks, Bell Labs Technical Journal 13(4), 175-194, 2009.

Gunes, T. T., Kwong U, S. T., & Afifi, H. (Jun. 2014) Hybrid model for lte network-assisted d2d communications. In International Conference on Ad-Hoc Networks and Wireless (pp. 100-113). Springer, Cham.

3GPP Technical Specification TS 23.002, v.15.0.0, 3rd Generation Partnership Project; Technical Specification Group Services and System Aspects; network Architecture (Release 15), (Mar. 2018).

3GPP Technical Specification TS 23.401, V15.4.0, 3rd Generation Partnership Project; Technical Specification Group Services and System Aspects; General Packet Ratio Service (GPRS) Enhancements for Evolved Universal Terrestrial Radio Access network (E-UTRAN) access (Release 15) (Jun. 2018).

* cited by examiner

MULTI-HOP RELAYING IN A MOBILE COMMUNICATION NETWORK

CROSS REFERENCE TO RELATED APPLICATIONS

The present application is a national stage entry of, and claims priority to, PCT/EP2019/068646, filed on Jul. 11, 2019, which claims priority to European Patent Application EP 18183059.7, filed in the European Patent Office on Jul. 12, 2018, both of which are hereby incorporated in their entirety herein by reference.

FIELD OF THE INVENTION

The invention relates to a client device for transmitting a relay request and a relay device for receiving a relay request.

The invention further relates to a method of transmitting a relay request and a method of receiving a relay request.

The invention also relates to a computer program product enabling a computer system to perform such methods.

BACKGROUND OF THE INVENTION

The number of devices that is able to connect to the Internet is expected to grow enormously, especially as a result of everyday objects having network connectivity. Not only do users communicate via Internet-connected devices, but devices also send data, e.g. sensor data or maps, to other devices (machine-to-machine communication) over the Internet. It is estimated that by the year 2020 50 billion devices will be connected. Therefore, it is no surprise that industry efforts and investments are directed towards this field. The category of mobile devices, e.g. mobile phones, tablets, wearable devices, wirelessly connected sensors and actuators, consumer electronic devices and devices embedded in vehicles, is an important category of devices that is able to connect to the Internet. In order to reduce power consumption, it is advantageous to relay data of certain devices, e.g. wearable devices, via other devices, e.g. smart phones.

Proximity Services (ProSe; 3GPP TS 23.303) is the name of the group of services used in LTE Mobile Networks to discover and communicate between user equipments (UEs) that are in proximity to one another. Proximity Services is a mechanism developed by 3GPP that allows a direct connection to be established between two UEs via an interface called PC5.

In mobile communications networks, links/bearers (e.g. PDP contexts, EPS Bearers, PDU sessions, or Radio Access Bearers, RAB, e-RAB, IP flows, signalling contexts) are used as logical connections for user data. Aspects like encryption and QoS may be associated with these bearers. With relaying, it is important that the end-to-end encryption (from UE to eNB or S-GW) is maintained. Layer 2 (data link layer) relaying is preferred, as this avoids that relaying UEs can intercept user data that they are relaying. Also, the relaying UEs may need to be able to determine the required QoS for the different bearers they are relaying. This implies that the relaying UEs need visibility of the links. An additional advantage of layer 2 relaying is that connection management and mobility in the mobile network (eNB, S-GW) works based on setting up and handing over bearers. If each UE that is connected via relays still has its own bearers, then these UEs can still be handled in the core network in a similar way as UEs that are directly connected to an eNB. Layer 2 ProSe relays are described in TR 23.733 ("Study on Architecture Enhancements to ProSe UE-to-Network Relay").

In a typical case of single-hop relaying, there are multiple UEs that form a personal area network and there is often only one smartphone which can be used as a relay. In a first relay scenario, a person carrying the multiple UEs hops onto a train. A problem arises in the single-hop case, because the smartphone cannot use the relay offered by the train, as there are sensors relaying via the smartphone. It is therefore beneficial to implement multi-hop relaying. In the multi-hop case, the smartphone could simply start using the relay offered by the train and sensors could, depending on their own configuration, either continue to use the smartphone or switch as well.

In another relay scenario, a sensor might be placed in a cellar, for example, with very limited to no network coverage. Depending on the conditions, the sensor might relay through another UE, which in itself might relay though yet another UE and yet another UE to reach the network.

In yet another relay scenario, large numbers of sensors and actuators are deployed on a production line of a factory. Because of the dynamic radio environment in the factory with high amounts of steel, it is difficult to connect sensors and actuators directly to base stations. An actuator may use a chain of other sensors and actuators to relay the communication to reach the network. When the radio environment in the factory changes, for example a new machine is placed or a vehicle moves through the factory, the chain of actuators and sensors that the actuator uses to reach the network may be dynamically reconfigured.

In yet another relay scenario, UEs deployed in for example a house or office are using radio communication at mmwave frequency bands. These frequency bands may be unlicensed frequency bands in the 57-71 GHz range or licensed frequency bands in the 24-28 GHz range for example. These mmwave frequency bands have the benefit of providing very high capacity but have a disadvantage of being easily blocked by walls, persons, furniture or other obstructions. As houses and offices generally contain numerous devices (mobile phones, TVs, computers, printers, consumer electronic devices, sensors) these devices together can dynamically form chains of relays that provide wireless connectivity for devices that cannot establish a direct radio link with an eNB.

At this moment, ProSe does not offer multi-hop relaying and existing techniques for multi-hop relaying cannot trivially be used together with layer 2 ProSe relays. The most obvious way of addressing the complexity of multi-hop layer 2 relaying involves the use of a central entity to determine and setup the network of UEs that use a relay and/or act as a relay. However, this is not a scalable solution if the chains of relaying devices are rather dynamic, which they will likely be in practice.

SUMMARY OF THE INVENTION

It is a first object of the invention to provide a client device, which helps setup multi-hop layer 2 relaying in a distributed manner.

It is a second object of the invention to provide a relay device, which helps setup multi-hop layer 2 relaying in a distributed manner.

It is a third object of the invention to provide a method of transmitting a relay request, which helps setup multi-hop layer 2 relaying in a distributed manner.

It is a fourth object of the invention to provide a method of receiving a relay request, which helps setup multi-hop layer 2 relaying in a distributed manner.

According to the invention, the first object is realized in that the client device comprises at least one receiver, at least one transmitter, and at least one processor configured to use said at least one transmitter to transmit a relay request to a relay device, said relay request comprising a first device identifier identifying said client device and one or more first link identifiers identifying one or more links, at least one of said one or more links linking a further device via said client device with a network node, use said at least one receiver to receive an acceptance message accepting said relay request from said relay device, and use said at least one transmitter to transmit data associated with said one or more links to said relay device in dependence on receipt of said acceptance message. The client device is a client with respect to the relay request, but acts as relay (device) with respect to link(s) linking the further device with the network node.

Another of said one or more links may link said client device with a network node (the same network node or a different network node). It is not necessary for a client device to relay all its links and a client device may relay different links via different relay devices. As example of the former, a client device may transmit large bandwidth links (e.g. WB-IoT) directly to the base station or to a Wi-Fi (IEEE 802.11) network. The client device's own link may be a large bandwidth link and/or the link the client device relays for the further device may be a large bandwidth link, for example. The opposite may also happen. Links with a lower data rate may be transmitted at lower frequency bands for which direct connectivity is possible. Higher data rate links require more capacity which may only be available at higher frequencies where direct connectivity to a base station may not always be feasible. Furthermore, for some links it is desirable to use licensed frequencies to a base station belonging to the mobile network, whereas for other links, it may be possible to use unlicensed frequencies to a residential gateway that is connected to a Local Area Network.

Said at least one processor may be configured to associate an identifier of said relay device with each of said one or more first link identifiers in link entries stored in a memory. This allows the client device to determine to which uplink device (relay device or base station) to relay or transmit data received from the further device based on an individual link identifier comprised in the data.

According to the invention, the second object is realized in that the relay device comprises at least one receiver, at least one transmitter, and at least one processor configured to use said at least one receiver to receive a relay request from a client device, said relay request comprising a first device identifier identifying said client device and one or more first link identifiers identifying one or more links, at least one of said one or more links linking a further device via said client device with a network node, determine whether said relay request can be accepted, associate said first device identifier with each of said one or more first link identifiers in link entries stored in a memory, and use said at least one transmitter to transmit an acceptance message accepting said relay request to said client device upon determining that said relay request can be accepted.

The inventors have recognized that in order to setup multi-hop layer 2 relaying in a distributed manner, a UE (client device) that wants to relay data via another UE (relay device) should transmit a relay request, even if this UE is acting as a relay itself. By letting each relay device decide individually whether to accept a relay request or not, circular relaying in which links are relayed in a loop can be avoided in a distributed manner. By restricting the scope of updates, as far as possible, to only those UEs that are affected by a change in a chain of relaying UEs, a scalable solution is obtained.

To allow the relay device to make this decision, the relay request should identify the link(s) that the requestor wants the relay device to relay. The relay device maintains per link (identifier) the identity of the downlink node (UE) and/or the identity of the uplink node (UE or base station) to allow it to perform downlink and/or uplink routing. This information is updated if a relay request is accepted by the relay device and may further be updated if a relay request is received by the relay device. The latter may be used for a certain type of loop detection, as explained in the description of the figures.

Said at least one processor may be configured to use said at least one receiver to receive data from a mobile communication network, said data comprising an individual link identifier, determine a device identifier associated with said individual link identifier from said link entries stored in said memory, and use said at least one transmitter to transmit said data to a device which identifies with said determined device identifier. In this way, the link entries are used to route data from the mobile communication network to the next hop downlink nodes. The data may be received from the mobile communication network via one or more relay devices.

Said at least one processor may be configured to determine whether said relay request can be accepted by using said received one or more first link identifiers and said link entries stored in said memory to determine whether a relaying loop would be established if said relay request would be accepted. This allows detection and prevention of relaying loops, i.e. relay devices being trapped in a relaying circle. This could happen when UE1 requests UE2 to relay on its behalf and UE2 requests UE3 to relay on its behalf, which in turn asks UE1 to relay for UE3.

Said at least one processor may be configured to determine that said relay request cannot be accepted if at least one of said received one or more first link identifiers is associated with information indicating that a link identified by said link identifier ends at said relay device. This information enables loop detection in a first manner. Acceptance of this relay request would have resulted in a relaying loop. This first manner of loop detection should work for all potential relaying loops if a client device always includes the link that ends at the client device in its relay requests.

Said at least one processor may be configured to transmit one or more second relay requests to a second relay device and/or a mobile communication network, said one or more second relay requests comprising a second device identifier identifying said relay device and one or more second link identifiers, said one or more second link identifiers comprising at least one of said received one or more first link identifiers. This allows the relay device to obtain information for deciding whether it can accept the relay request. A second relay request may be transmitted for all the received one or more first link identifiers or a subset thereof, e.g. only the ones that are not present in the stored link entries yet. The at least one processor initiates transmission of the second relay request to the second relay device after receiving the relay request from the client device.

Said at least one processor may be configured to indicate in one or more of said link entries that a relay request is pending, said one or more link entries being associated with said one or more second link identifiers. This information enables loop detection in a second manner. The indication may be stored when the second relay request is transmitted, for example.

Said at least one processor may be configured to use said at least one receiver to receive a third relay request from said client device or a further client device, said third relay request comprising a third device identifier and one or more third link identifiers, and determine that said relay request cannot be accepted if at least one of said third link identifiers is indicated as having a pending relay request. This second manner of loop detection should work for all potential relaying loops if all the received one or more first link identifiers are included in a second relay request (e.g. in the same second relay request or in different second relay requests). Like the first relay request, the third relay request is a relay request received by the relay device (the second relay request is transmitted by the relay device). If the third relay request is received by the relay device as a result of the relay device transmitting the second request, accepting the third relay request would cause a loop. This is preferably implemented in relay devices in the general sense, i.e. also in relay devices that relay data from devices that do not relay data themselves.

Said at least one processor may be configured to determine whether at least one of said first link identifiers is not included in said link entries stored in said memory, and transmit one or more second relay requests to a second relay device and/or a mobile communication network if at least one of said first link identifiers is not included in said link entries, said one or more second relay requests comprising a second device identifier identifying said relay device and said at least one first link identifier. When a link identifier is not included in the link entries, it is necessary to establish an uplink for this link identifier. This uplink does not have to be to a base station (e.g. eNodeB), but can also be to a second relay device. If it is decided to request a second relay device to relay multiple links, this is preferably performed with a single relay request, but could also be performed with multiple relay requests.

Said at least one processor may be configured to associate one or more of said first link identifiers which are included in said link entries with said first device identifier without transmitting a relay request which comprises said one or more first link identifiers included in said link entries. For first link identifiers which are included in the link entries, the existing uplink relay device (UE) and existing layer 1 bearers may continue to be used when the downlink client device (UE) changes. The downlink client device typically changes when the current downlink client device has asked another relay device to relay the link, but this other relay device requests the relay device to relay the link, or when the current downlink client device is relaying the link for a further device and this further device requests to relay the link directly via the relay device, thereby becoming the new downlink client device for this link at the relay device. In this case, it may not be necessary to transmit a second relay request for these first link identifiers to the existing uplink relay device.

According to the invention, the third object is realized in that the method of transmitting a relay request comprises transmitting a relay request to a relay device, said relay request comprising a first device identifier identifying said client device and one or more first link identifiers identifying one or more links, at least one of said one or more links linking a further device with a network node via said client device, receiving an acceptance message accepting said relay request from said relay device, and transmitting data associated with said one or more links to said relay device in dependence on receipt of said acceptance message. Said method may be performed by software running on a programmable device. This software may be provided as a computer program product.

According to the invention, the fourth object is realized in that the method of receiving a relay request comprises receiving a relay request from a client device, said relay request comprising a first device identifier identifying said client device and one or more first link identifiers identifying one or more links, at least one of said one or more links linking a further device with a network node via said client device, determining whether said relay request can be accepted, associating said first device identifier with each of said one or more first link identifiers in link entries, and transmitting an acceptance message accepting said relay request to said client device upon determining that said relay request can be accepted. Said method may be performed by software running on a programmable device. This software may be provided as a computer program product.

In another aspect of the invention, a relay device comprises at least one receiver, at least one transmitter, and at least one processor configured to use said at least one receiver to receive data comprising an individual link identifier, determine a device identifier associated with said individual link identifier from link entries stored in a memory, said link entries associating device identifiers with link identifiers, and use said at least one transmitter to transmit said data to a device which identifies with said determined device identifier. The data may be received via one or more further relay devices. The device identifiers identify next hop downlink nodes.

In another aspect of the invention, a method of routing data comprises receiving data comprising an individual link identifier, determining a device identifier associated with said individual link identifier from link entries stored in a memory, said link entries associating device identifiers with link identifiers, transmitting said data to a device which identifies with said determined device identifier. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a first software code portion, the first software code portion, when executed or processed by a computer, being configured to perform executable operations comprising: transmitting client information comprises receiving service information from a first network device in a first communication network, determining time periods from said service information, said time periods indicating when said client device is unavailable for receiving transmissions from a second network device in a second communication network, and transmitting client information to said second network device, said client information identifying said time periods.

A non-transitory computer-readable storage medium stores at least a second software code portion, the second software code portion, when executed or processed by a computer, being configured to perform executable operations comprising: receiving client information from a client device, said client information identifying time periods, determining exclusion time periods from said client information, preparing transmission of a data unit to said client device, scheduling transmission of said data unit at a time outside said exclusion time periods, and transmitting said data unit to said client device at said scheduled time.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the users computer, partly on the users computer, as a stand-alone software package, partly on the user's computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
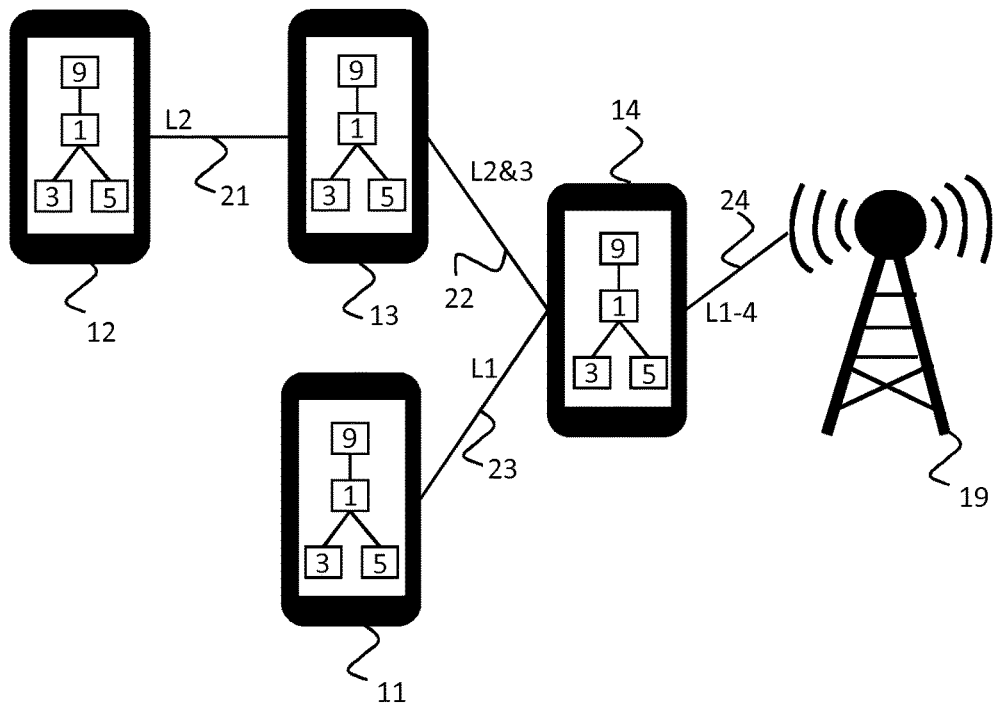
FIG. 1 depicts an embodiment of the client device of the invention and an embodiment of the relay device of the invention.

First embodiments of the client and relay devices of the invention are shown in FIG. 1. Four mobile devices 11-14 (UE1-UE4) are represented in FIG. 1. In the embodiment of FIG. 1, each of the mobile devices 11-14 is able to act as client device of the invention, as relay device of the invention or as both. In the example depicted in FIG. 1, mobile device 13 (UE3) acts as client device of the invention and mobile device 14 (UE4) acts as relay device of the invention. Like mobile device 13, mobile devices 11 and 12 also have their data relayed and could be considered to be client devices in the general sense. Like mobile device 14, mobile device 13 also relays data and could itself be considered to be a relay device in the general sense. In the embodiment of FIG. 1, each of the mobile devices 11-14 comprises a processor 1, a receiver 3, a transmitter 5 and a memory 9.

To allow a mobile device to act as client device of the invention, the processor 1 is configured to use the transmitter 5 to transmit a relay request to a relay device, the relay request comprising a first device identifier identifying the client device and one or more first link identifiers identifying one or more links of which at least links a further device with a network node via the client device, use the receiver 3 to receive an acceptance message accepting the relay request from the relay device, and use the transmitter 5 to transmit data associated with the one or more links to the relay device in dependence on receipt of the acceptance message. In the embodiment of FIG. 1, the processor 1 is further configured to associate an identifier of the relay device with each of the one or more first link identifiers in link entries stored in the memory 9.

In the example of FIG. 1, the mobile device 13 transmits a relay request to the mobile device 14 and this relay request identifies at least a link between mobile device 12 and a network node. This network node may be base station 19 or another device in the mobile communication network. The base station 19 may be an LTE eNodeB or a 5G gNodeB and the mobile devices 11-14 may be LTE or 5G UEs, for example.

To allow a mobile device to act as relay device of the invention, the processor 1 is configured to use the receiver 3 to receive the relay request from the client device, determine whether the relay request can be accepted, associate the first device identifier with each of the one or more first link identifiers in link entries stored in the memory 9, and use the transmitter 5 to transmit an acceptance message accepting the relay request (e.g. a RelayResponse message with the flag "accept" set to 1) to the client device upon determining that the relay request can be accepted.

In the embodiment of FIG. 1, the processor 1 of each of the mobile devices is further configured to use the receiver 3 to receive data which comprises an individual link identifier from the base station 19, determine a device identifier associated with the individual link identifier from the link entries stored in the memory 9, and use the transmitter 5 to transmit the data to a device which identifies with the determined device identifier. In other words, a mobile device that relays data uses the link identifier in the data received from the mobile communication network to identify the downlink mobile device to which it should relay the received data. In the example of FIG. 1, the data received by the mobile device 14 might comprise an individual link identifier associated in the link entries with the mobile device 11, the mobile device 13 or itself.

In the embodiment of FIG. 1, the processor 1 of each of the mobile devices is further configured to determine whether the relay request can be accepted by using the received one or more first link identifiers and the link entries stored in the memory 9 to determine whether a relaying loop would be established if the relay request would be accepted. This will be explained later in the description.

The relay request may have the form RelayRequest(<device identifier of requestor>, <identifier of link 1>, <identifier of link 2>, . . . ), for example. The table may, for example, associate each link identifier with a downlink device identifier and an uplink device identifier and may, for example, have the following form:

| L-ID | DL | UL |
|------|------|------|
| L1 | 11 | NW |
| L2 | 11 | NW |
| L3 | 11 | NW |
| L4 | self | NW |

Each mobile device typically has one or more (logical) links (e.g. PDP context, EPS Bearer, signalling context, PDU session, IP flows, or Radio Access Bearer—RAB, e-RAB) with a node (e.g. NodeB, eNodeB, gNb, S-GW, P-GW, UPF, MME, AMF, SMF) in the network.

Identifiers of these links may be stored in the table of link entries as link identifiers (L-IDs), for example. The downlink device identifiers (DL) and uplink device identifiers (UL) may be TMSIs, GUTIs, ProSe identifiers, or identifications of the (PC5) connections used to reach the downlink or uplink devices, for example.

Such a table may be used by a relay device to implement forwarding in a multi-hop relay network. The processor of such a relay device is configured to use its receiver(s) to receive data from a mobile communication network. The data comprises an individual link identifier. The processor may further be configured to determine a device identifier associated with the individual link identifier from link entries stored in a memory (e.g. in a table such as shown in Table 1). The link entries associate device identifiers with link identifiers. The processor is further configured to use the transmitter(s) to transmit the data to a device which identifies with the determined device identifier.

In an alternative embodiment, not all mobile devices have the capability to act as relay device, e.g. not all mobile devices are LTE or 5G UEs, and/or one or more mobile devices are configured not to act as relay device.

In the embodiment shown in FIG. 1, the mobile devices 11-14 comprises one processor 1. In an alternative embodiment, the mobile device comprises multiple processors 1. The receiver 3 and the transmitter 5 of the mobile devices 11-14 may use one or more cellular communication technologies such as GPRS, CDMA, UMTS, LTE, and/or 5G NR to communicate with the base station 19, for example. The receiver 3 and the transmitter 5 may be combined in a transceiver. The processor 1 may be a general-purpose processor, e.g. an ARM processor, or an application-specific processor.

The processor 1 may run Google Android or Apple iOS as operating system, for example. The memory 9 may comprise one or more memory units. The memory 9 may comprise solid state memory, for example. The mobile device may comprise other components typical for a mobile device, e.g. a display and a battery. The mobile device may be a mobile phone, for example. In another embodiment, the client device of the invention and/or the relay device of the invention may be a device other than a mobile device, e.g. a sensor, actuator, consumer electronics device, media device, computer, printer, game console, home control console or residential gateway.

Figure 2:
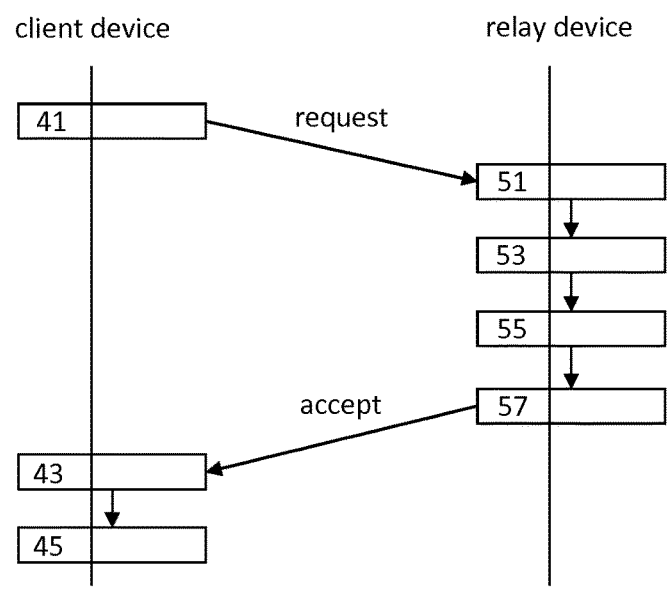
FIG. 2 is a flow diagram of a first embodiment of the methods of the invention.

A first embodiment of the methods of the invention is shown in FIG. 2. The steps 41, 43 and 45 are performed by the client device of the invention. Steps 51, 53, 55 and 57 are performed by the relay device of the invention. Step 41 comprises the client device transmitting a relay request to the relay device. The relay request comprises a first device identifier identifying the client device and one or more first link identifiers identifying one or more links of which at least one links a further device with a network node via the client device. Step 51 comprises the relay device receiving the relay request from the client device.

Step 53 comprises the relay device determining whether the relay request can be accepted. The relay device may decide not to accept the relay request if it detects a loop, if its battery is low, if does not have the capability of acting as a relay, if it is unable to provide the desired Quality of Service, or because it has been configured to reject any relay request, for example. Step 55 comprises the relay device storing an association which associates the first device identifier with each of the one or more first link identifiers in link entries. The associations previously stored in step 55 may be consulted in step 53 to detect a loop. Step 57 comprises the relay device transmitting an acceptance message accepting the relay request to the client device upon determining that the relay request can be accepted. Step 43 comprises the client device receiving the acceptance message from the relay device. Step 45 comprises transmitting data associated with the one or more links to the relay device in dependence on receipt of the acceptance message.

Figure 3:
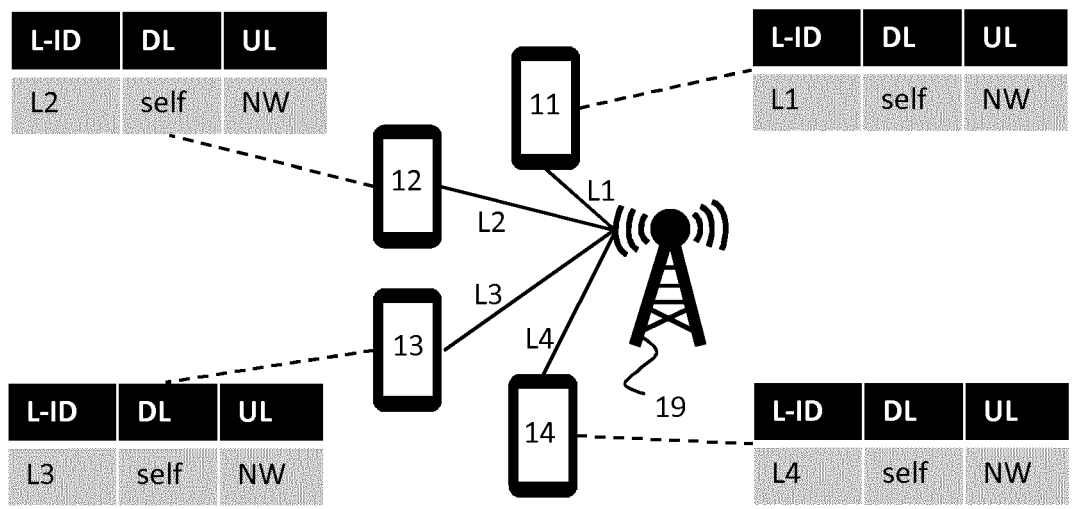
FIG. 3 helps illustrate the state of the mobile devices of FIG. 1 at a first moment.

FIG. 3 shows the mobile device 11-14 and the base station 19 at a first moment, which is a different moment than depicted in FIG. 1. At this first moment, the mobile devices 11-14 are all connected directly to the base station 19 and no relaying is performed. In the embodiments of FIGS. 3-19, tables are used to store link identifiers associated with both an identifier of a downlink device and an identifier of an uplink device. In an alternative embodiment, identifiers of the uplink devices are stored in a different table than the identifiers of the downlink identifiers.

In an alternative embodiment, a mobile device uses the same uplink device for all links and does not associate an identifier of the uplink device with each individual link identifier. In an alternative embodiment, relaying is only used for data received from the mobile communication network or only used for data transmitted to the mobile communication network. In the embodiments of FIGS. 3-19, tables are stored by each mobile device, also when it does not relay data. In an alternative embodiment, a mobile device creates a table or tables as soon as it starts relaying.

In the example of FIG. 3, at the first moment, the mobile device 11 stores a table which associates a link L1 with a downlink device identifier "self" and an uplink device identifier of the base station 19/mobile communication network ("NW"). The mobile device 12 stores a table which associates a link L2 with a downlink device identifier "self" and an uplink device identifier of the base station 19/mobile communication network. the mobile device 13 stores a table which associates a link L3 with a downlink device identifier "self" and an uplink device identifier of the base station 19/mobile communication network. the mobile device 14 stores a table which associates a link L4 with a downlink device identifier "self" and an uplink device identifier of the base station 19/mobile communication network.

Figure 4:
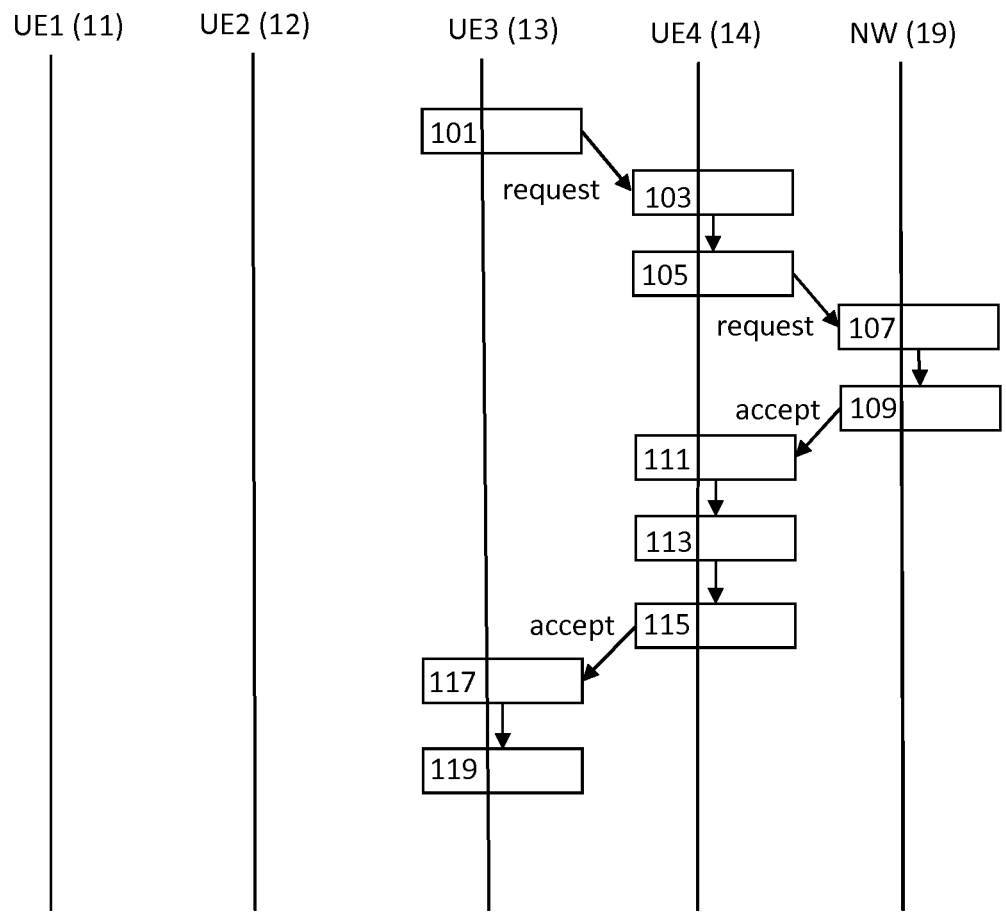
FIG. 4 is a flow diagram depicting steps performed between the first moment of FIG. 3 and the second moment of FIG. 5 in a second embodiment of the methods of the invention.

FIG. 4 shows the steps performed by the different devices of FIG. 3 in second embodiments of the methods of the invention when mobile device 13 requests mobile device 14 to act as relay for link L3. A step 101 comprises mobile device 13 transmitting a relay request to mobile device 14. Step 103 comprises mobile device 14 receiving this relay request.

In the embodiments of FIGS. 3 to 19, the mobile device receiving the relay request determines whether the relay request can be accepted and does this by using the received one or more link identifiers (also referred to as first link identifiers) and the link entries stored in the memory to determine whether a relaying loop would be established if the relay request would be accepted. In the embodiments of FIGS. 3 to 15, the mobile device receiving the relay request determines that the relay request cannot be accepted if at least one of the received one or more first link identifiers is associated with information indicating that a link identified by the link identifier ends at the relay device, i.e. if at least one of the link identifiers is associated with the device identifier "self". In the examples of FIGS. 3 to 19, each mobile device has at most one link. However, it is also possible that a relay request is received from a mobile device that establishes an additional bearer/link next to one(s) it already has and wants to have that link relayed via the same mobile device.

In the embodiments of FIGS. 3 to 15, the mobile device 14 determines whether at least one of the link identifiers included in the received relay request is not included in the link entries stored in the memory and transmits one or more second relay requests to a second relay device and/or a mobile communication network if at least one of the first link identifiers is not included in the link entries. The one or more second relay requests comprise a second device identifier identifying the relay device and the at least one first link identifier. The one or more of the first link identifiers which are included in the link entries stored in the memory of the mobile device 14 are associated with the first device identifier, which is included in the first relay request along with the one or more first link identifiers, without transmitting a second relay request which comprises these one or more first link identifiers.

In the embodiments of FIG. 4, the second relay request would not be transmitted and received in steps 105 and 107, respectively, if the first link identifiers would already be included in the link entries stored in the memory of mobile device 14. In an alternative embodiment, the second relay request would be transmitted and received in steps 105 and 107, respectively, even if the link identifiers included in the (first) relay request would already be included in the link entries stored in the memory.

Since the table stored by mobile device 14 does not include link L3 yet, steps 105 and 107 are performed next. Step 105 comprises mobile device 14 transmitting a second relay request for link L3 to the base station 19. Step 107 comprises the base station 19 receiving this second relay request. After the base station 19 has received the second relay request in step 107, it determines that it can accept the relay request and transmits an acceptance message (e.g. a RelayResponse message with the flag "accept" set to 1) to the mobile device 14 in step 109 indicating that the second relay request has been accepted. The mobile device 14 receives this acceptance message in step 111. The base station 19 may be configured to only accept the relay request if the desired Quality of Service for the link matches its radio capabilities and/or subscription information stored in the mobile communication network allows mobile device 14 to act as a relay, for example.

As the mobile device 14 had no own reason to reject the relay request for link L3 and the base station 19 is willing to relay link L3, mobile device 14 can accept the relay request from mobile device 13. Mobile device 14 therefore adds an entry for link L3 to its table in step 113. In this entry, link L3 is associated with a downlink device identifier for mobile device 13 and an uplink device identifier for base station 19/mobile communication network.

Figure 5:
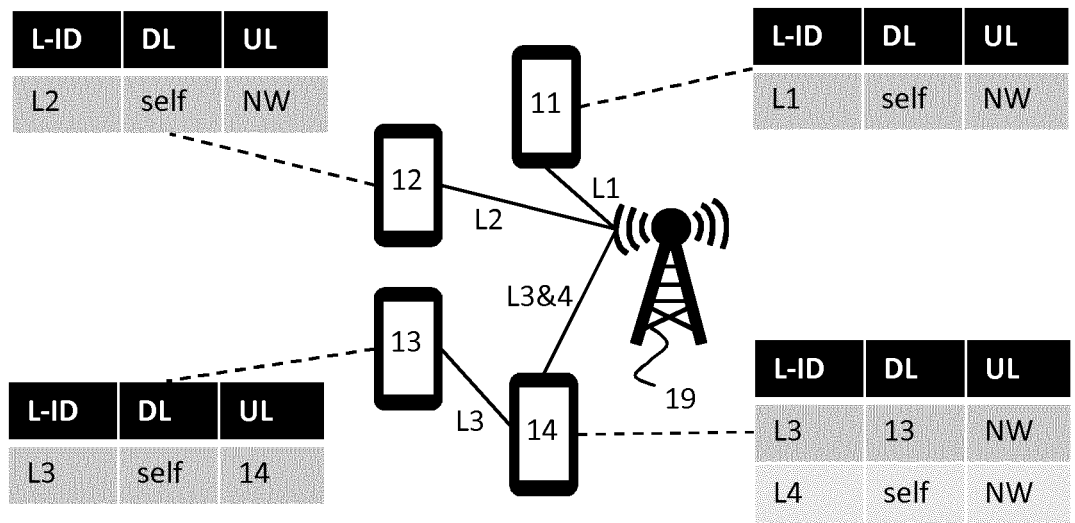
FIG. 5 helps illustrate the state of the mobile devices of FIG. 1 at a second moment.

Mobile device 14 then transmits an acceptance message indicating that the (first) relay request has been accepted to mobile device 13 in step 115. The mobile device 13 receives this acceptance message in step 117. Mobile device 13 then adds an entry for link L3 to its table in step 119. In this entry, link L3 is associated with a downlink device identifier "self" and an uplink device identifier of the mobile device 14. The resulting tables are shown in FIG. 5. FIG. 5 also shows that mobile device 13 now relays data via mobile device 14 to the base station 19 instead of connecting directly to the base station 19.

Figure 6:
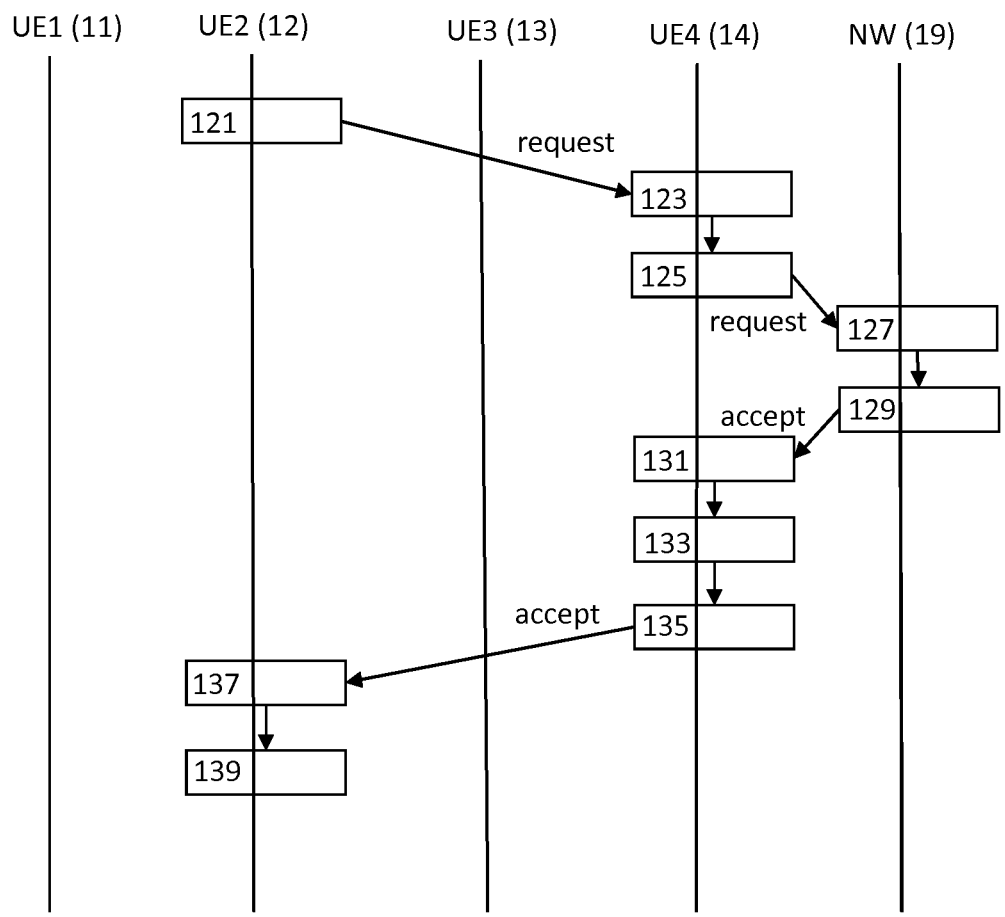
FIG. 6 is a flow diagram depicting steps performed between the second moment of FIG. 5 and the third moment of FIG. 7.

FIG. 6 shows the steps performed by the different devices of FIG. 5 when mobile device 12 requests mobile device 14 to act as relay for link L2. A step 121 comprises mobile device 12 transmitting a relay request to mobile device 14. Step 123 comprises mobile device 14 receiving this relay request. Since the table stored by mobile device 14 does not include link L2 yet, steps 125 and 127 are performed next.

Step 125 comprises mobile device 14 transmitting a second relay request for link L2 to the base station 19. Step 127 comprises the base station 19 receiving this second relay request. After the base station 19 has received the second relay request in step 127, it determines that it can accept the relay request and transmits an acceptance message indicating that the second relay request has been accepted to the mobile device 14 in step 129. The mobile device 14 receives this acceptance message in step 131.

As the mobile device 14 had no own reason to reject the relay request for link L2 and the base station 19 is willing to relay link L2, mobile device 14 can accept the relay request from mobile device 12. Mobile device 14 therefore adds an entry for link L2 to its table in step 133. In this entry, link L2 is associated with a downlink device identifier for mobile device 12 and an uplink device identifier for base station 19/mobile communication network.

Figure 7:
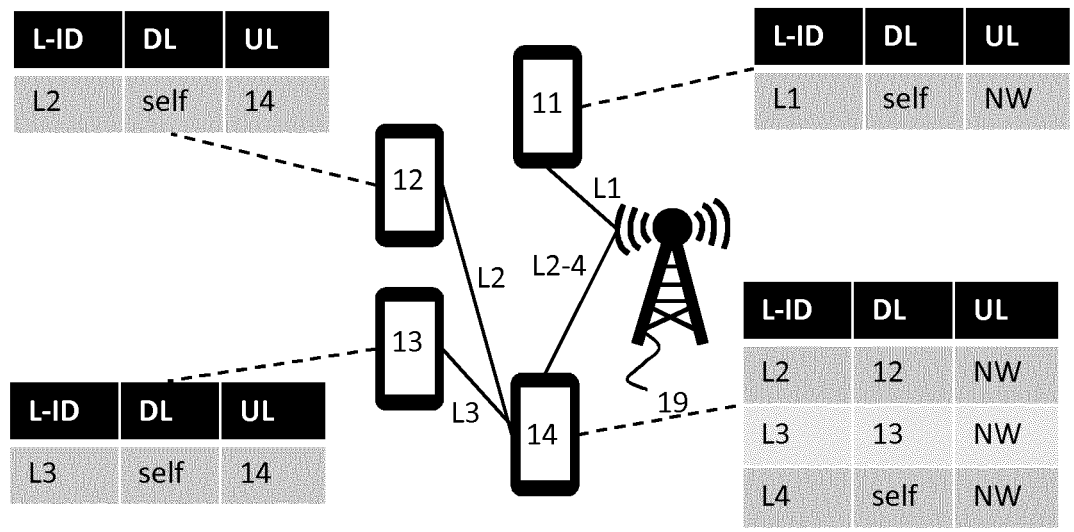
FIG. 7 helps illustrate the state of the mobile devices of FIG. 1 at a third moment.

Mobile device 14 then transmits an acceptance message to mobile device 12 in step 135 indicating that the first relay request has been accepted. The mobile device 12 receives this acceptance message in step 137. Mobile device 12 then adds an entry for link L2 to its table in step 139. In this entry, link L2 is associated with a downlink device identifier "self" and an uplink device identifier of the mobile device 14. The resulting tables are shown in FIG. 7. FIG. 7 also shows that mobile device 12 now relays data via mobile device 14 to the base station 19 instead of connecting directly to the base station 19.

Figure 8:
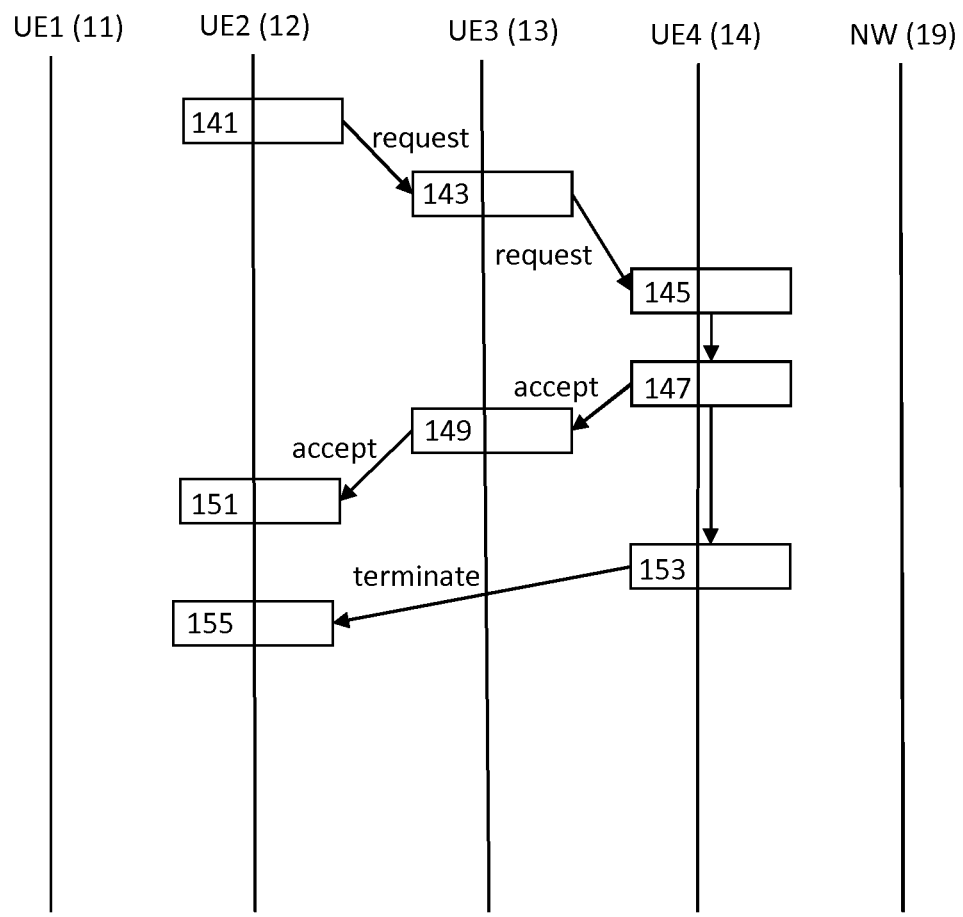
FIG. 8 is a flow diagram depicting steps performed between the third moment of FIG. 7 and the fourth moment of FIG. 9.

FIG. 8 shows the steps performed by the different devices of FIG. 7 when mobile device 12 requests mobile device 13 to act as relay for link L2. A step 141 comprises mobile device 12 transmitting a relay request to mobile device 13. Since the table stored by mobile device 13 does not include link L2 yet, mobile device 13, after receiving the relay request, transmits a second relay request for link L2 to mobile device 14 in step 143. Mobile device 13 transmits this second relay request to mobile device 14 and not to base station 19, because mobile device 13 is already having its own data, i.e. link L3, relayed via mobile device 14. Step 145 comprises the mobile device 14 receiving this second relay request.

Although the table stored by mobile device 14 already includes link L2, mobile device 14 can accept the second relay request, because L2 is associated with a downlink device identifier of the mobile device 12 and not with the downlink device identifier "self". Mobile device 14 does not need to transmit a third relay request to base station 19, because link L2 is already associated with an uplink device identifier for base station 19/mobile communication network, which means that there is no change as far as the base station 19/mobile communication network is concerned.

In step 147, mobile device 14 therefore updates the entry for link L2 so that it is associated with a downlink device identifier for mobile device 13 instead of a downlink device identifier for mobile device 12 and transmits an acceptance message to the mobile device 13 indicating that the second relay request has been accepted.

As the mobile device 13 had no own reason to reject the relay request for link L2 and mobile device 14 is willing to relay link L2, mobile device 13 can accept the relay request from mobile device 12. Mobile device 13 therefore, after receiving the acceptance message, adds an entry for link L2 to its table and transmits an acceptance message to mobile device 12 in step 149 indicating that the first relay request has been accepted. In this entry, link L2 is associated with a downlink device identifier for mobile device 12 and an uplink device identifier for mobile device 14.

In step 151, mobile device 12 receives this acceptance message and then updates the entry for link L2 so that it is associated with an uplink device identifier for mobile device 13 instead of an uplink device identifier for mobile device 14. The association between the link L2 and the downlink device identifier "self" is not changed. As mobile device 14 has removed the downlink device identifier for mobile device 12 from its entry for link L2, the mobile device 14 transmits a relay termination message for link L2 to mobile device 12 in step 153.

The mobile device 12 receives this relay termination message in step 155, but ignores this message, because the entry for link L2 is not associated with an uplink device identifier for mobile device 14, but with an uplink device identifier for mobile device 13. If the mobile device 12 had received this relay termination message before it received the acceptance message in step 151, then the mobile device 12 would associate the link L2 with mobile device 13 instead of mobile device 14 and postpone relaying to mobile device 13 until the acceptance message for link L2 would be received in step 151. In the unlikely scenario that a rejection message for link L2 would have been received instead of an acceptance message (after receiving the relay termination message), mobile device 12 would then have removed the entry for link L2.

Figure 9:
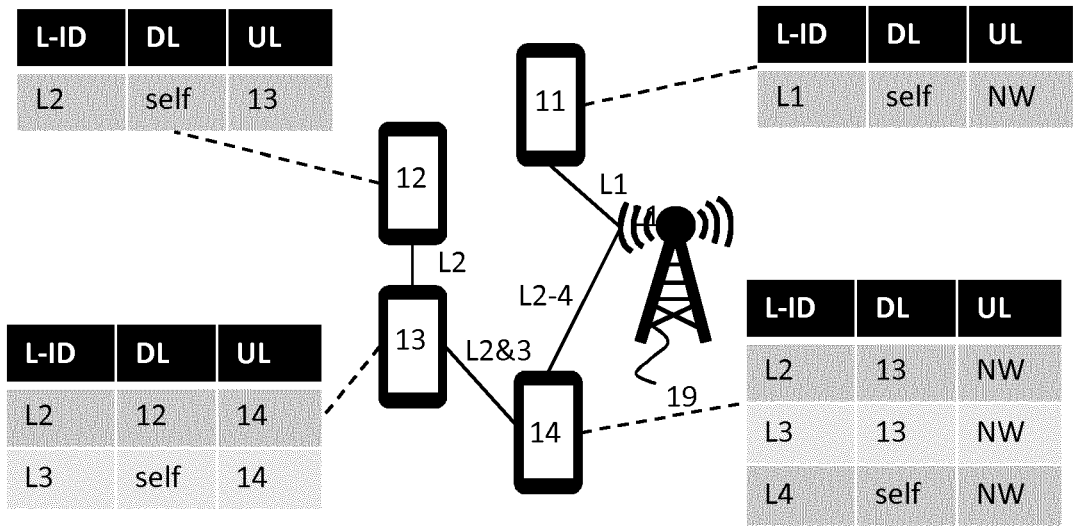
FIG. 9 helps illustrate the state of the mobile devices of FIG. 1 at a fourth moment.

The resulting tables are shown in FIG. 9. FIG. 9 also shows that mobile device 12 now has its data relayed via mobile device 13 and mobile device 14 to the base station 19 instead of having its data relayed only via mobile device 14 to the base station 19.

Figure 10:
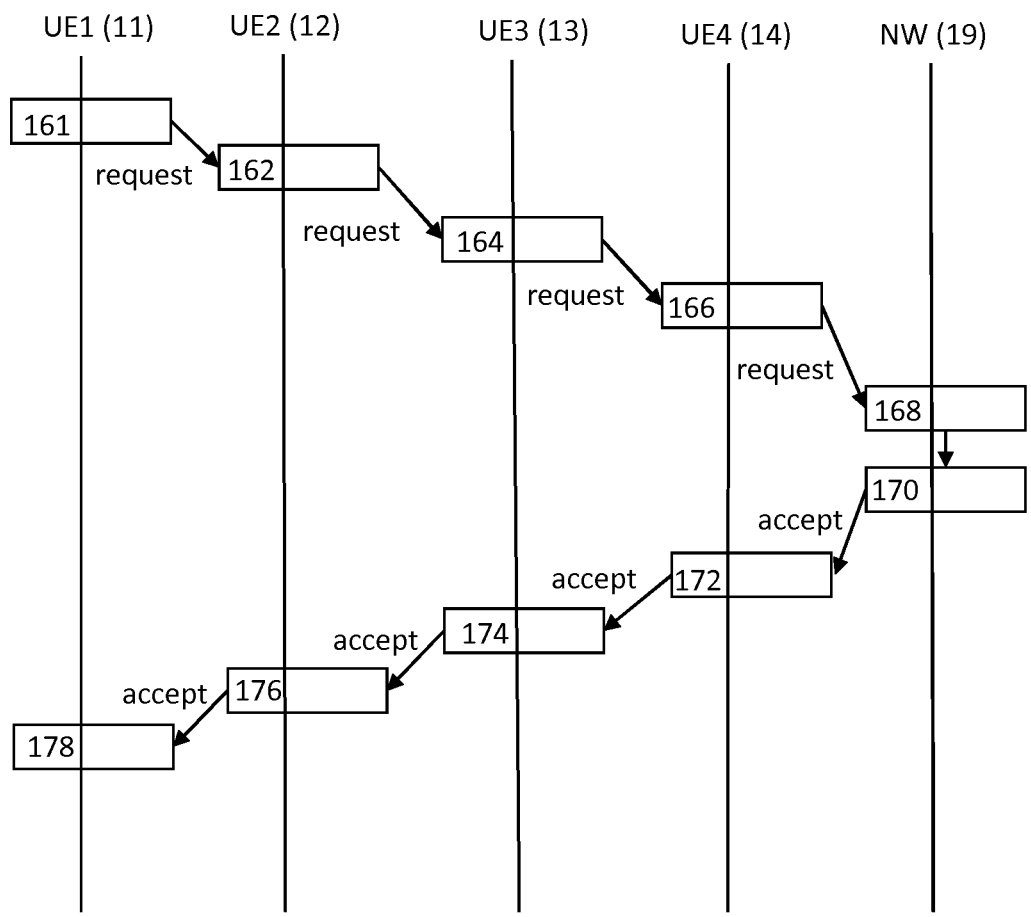
FIG. 10 is a flow diagram depicting steps performed between the fourth moment of FIG. 9 and the fifth moment of FIG. 11.

FIG. 10 shows the steps performed by the different devices of FIG. 9 when mobile device 11 requests mobile device 12 to act as relay for link L1. A step 161 comprises mobile device 11 transmitting a relay request to mobile device 12. Since the table stored by mobile device 12 does not include link L1 yet, mobile device 12, after receiving the relay request, transmits a second relay request for link L1 to mobile device 13 in step 162. Mobile device 12 transmits this second relay request to mobile device 13 and not to base station 19, because mobile device 12 is already having its link L2 relayed via mobile device 13.

Since the table stored by mobile device 13 does not include link L1 yet, mobile device 13, after receiving the relay request, transmits a third relay request for link L1 to mobile device 14 in step 164. Mobile device 13 transmits this second relay request to mobile device 14 and not to base station 19, because mobile device 13 is already having its links L2 and L3 relayed via mobile device 14.

Since the table stored by mobile device 14 does not include link L1 yet, mobile device 14, after receiving the relay request, transmits a fourth relay request for link L1 to base station 19 in step 166. After the base station 19 has received the fourth relay request in step 168, it determines that it can accept the fourth relay request and transmits an acceptance message indicating that the fourth relay request has been accepted to the mobile device 14 in step 170.

As the mobile device 14 had no own reason to reject the relay request for link L1 and base station 19 is willing to relay link L1, mobile device 14 can accept the relay request from mobile device 13. Mobile device 14 therefore, after receiving the acceptance message, adds an entry for link L1 to its table and transmits an acceptance message indicating that the third relay request has been accepted to mobile device 13 in step 172. In this entry, link L1 is associated with a downlink device identifier for mobile device 13 and an uplink device identifier for base station 19/mobile communication network.

As the mobile device 13 had no own reason to reject the relay request for link L1 and mobile device 14 is willing to relay link L1, mobile device 13 can accept the second relay request from mobile device 12. Mobile device 13 therefore, after receiving the acceptance message, adds an entry for link L1 to its table and transmits an acceptance message to mobile device 12 in step 174 indicating that the second relay request has been accepted. In this entry, link L1 is associated with a downlink device identifier for mobile device 12 and an uplink device identifier for mobile device 14.

As the mobile device 12 had no own reason to reject the relay request for link L1 and mobile device 13 is willing to relay link L1, mobile device 12 can accept the first relay request from mobile device 11. Mobile device 12 therefore, after receiving the acceptance message, adds an entry for link L1 to its table and transmits an acceptance message to mobile device 11 in step 176 indicating that the first relay request has been accepted. In this entry, link L1 is associated with a downlink device identifier for mobile device 11 and an uplink device identifier for mobile device 13.

Figure 11:
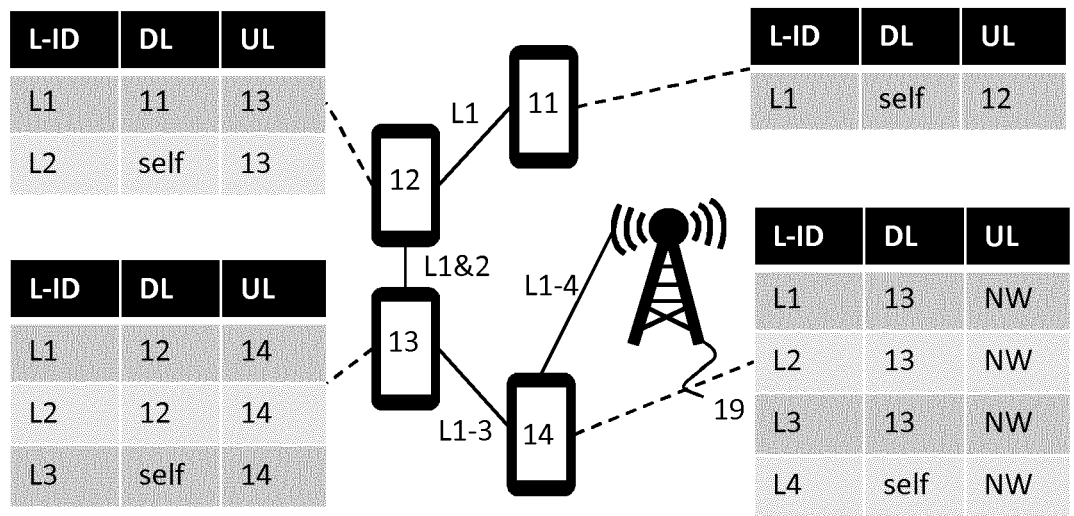
FIG. 11 helps illustrate the state of the mobile devices of FIG. 1 at a fifth moment.

In step 178, mobile device 11 receives this acceptance message and then updates the entry for link L1 so that it is associated with an uplink device identifier for mobile device 12 instead of an uplink device identifier for base station 19/mobile communication network. The association between the link L1 and the downlink device identifier "self" is not changed. The resulting tables are shown in FIG. 11. FIG. 11 also shows that mobile device 11 now has its data relayed via mobile device 12, mobile device 13 and mobile device 14 to the base station 19 instead of connecting directly to the base station 19.

Figure 12:
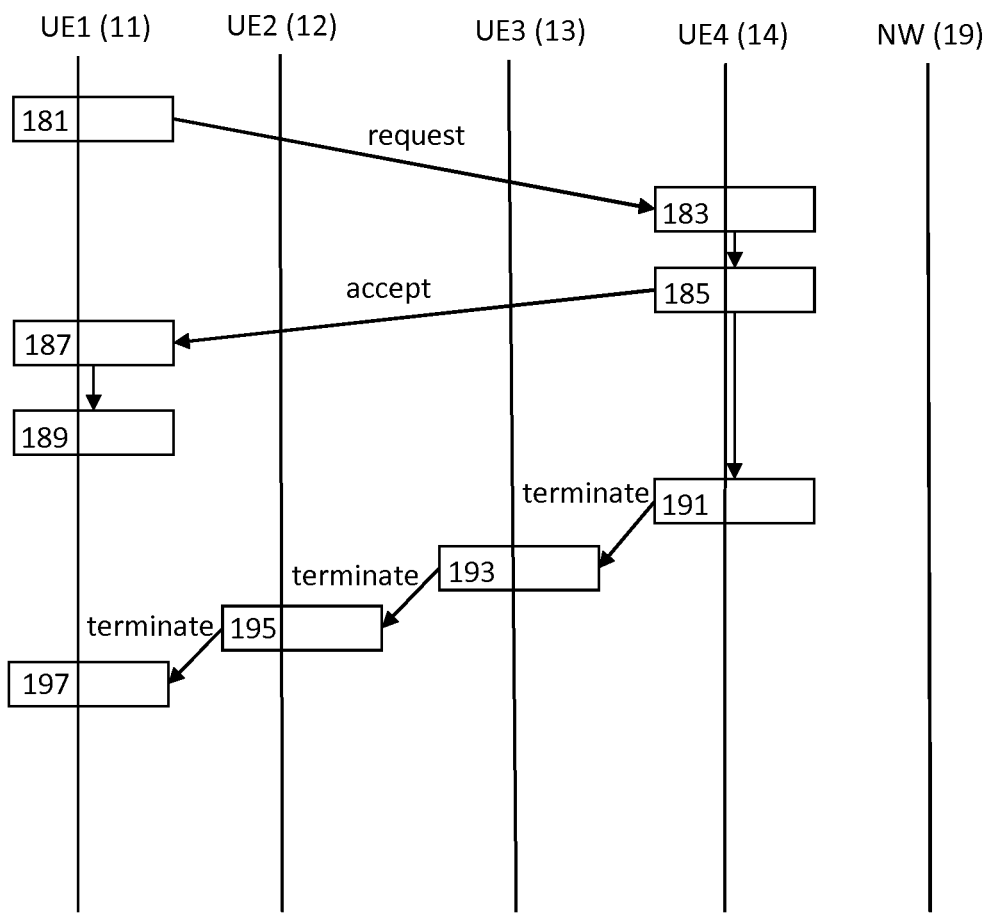
FIG. 12 is a flow diagram depicting steps performed between the fifth moment of FIG. 11 and the sixth moment of FIG. 13.

FIG. 12 shows the steps performed by the different devices of FIG. 11 when mobile device 11 requests mobile device 14 to act as relay for link L1. A step 181 comprises mobile device 11 transmitting a relay request to mobile device 14. Step 183 comprises mobile device 14 receiving this relay request. Although the table stored by mobile device 14 already includes link L1, mobile device 14 can accept the relay request, because L1 is associated with a downlink device identifier of the mobile device 13 and not with the downlink device identifier "self".

Mobile device 14 does not need to transmit a second relay request to base station 19, because link L1 is already associated with an uplink device identifier for base station 19/mobile communication network, which means that there is no change as far as the base station 19/mobile communication network is concerned. In step 185, mobile device 14 therefore updates the entry for link L1 so that it is associated with a downlink device identifier for mobile device 11 instead of a downlink device identifier for mobile device 13 and transmits an acceptance message indicating that the relay request has been accepted to the mobile device 11.

Mobile device 11 receives this acceptance message in step 187 and then updates the entry for link L1 in step 189 so that it is associated with an uplink device identifier for mobile device 14 instead of an uplink device identifier for mobile device 12. The association between the link L1 and the downlink device identifier "self" is not changed. As mobile device 14 has removed the downlink device identifier for mobile device 13 from its entry for link L1, the mobile device 14 transmits a relay termination message for link L1 to mobile device 13 in step 191.

In step 193, the mobile device 13 receives this first relay termination message, determines that link L1 was associated with downlink device identifier for mobile device 12, transmits a second relay termination message for link L1 to mobile device 12 and removes the entry for link L1. In step 195, the mobile device 12 receives this second relay termination message, determines that link L1 is currently associated with downlink device identifier for mobile device 11, transmits a third relay termination message for link L1 to mobile device 11 and removes the entry for link L1.

Figure 13:
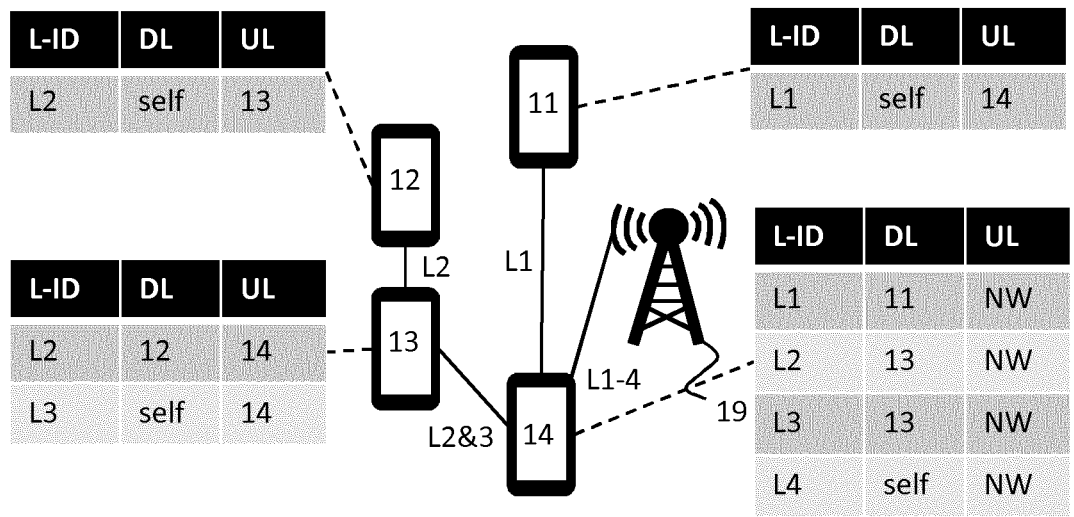
FIG. 13 helps illustrate the state of the mobile devices of FIG. 1 at a sixth moment.

The mobile device 11 receives this third relay termination message from mobile device 12 in step 197, but ignores this message, because the entry for link L1 is not associated with an uplink device identifier for mobile device 12, but with an uplink device identifier for mobile device 14. The resulting tables are shown in FIG. 13. FIG. 13 also shows that mobile device 11 now has its data relayed only via mobile device 14 to the base station 19 instead of having its data relayed via mobile device 12, mobile device 13 and mobile device 14 to the base station 19. The relays depicted in FIG. 13 correspond to the relays depicted in FIG. 1.

Figure 14:
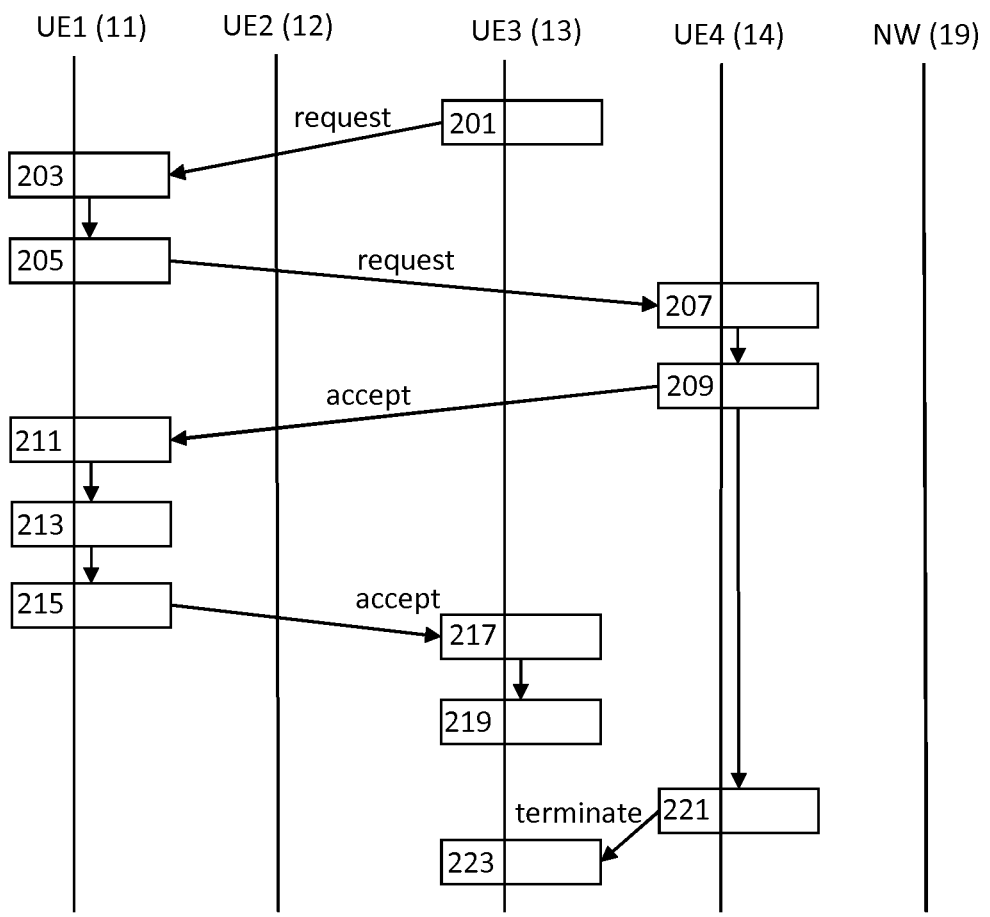
FIG. 14 is a flow diagram depicting steps performed between the sixth moment of FIG. 13 and the seventh moment of FIG. 15.

FIG. 14 shows the steps performed by the different devices of FIG. 13 when mobile device 13 requests mobile device 11 to act as relay for links L2 and L3. A step 201 comprises mobile device 13 transmitting a relay request to mobile device 11. Since the table stored by mobile device 11 does not include link L2 or L3 yet, mobile device 11, after receiving the relay request, transmits a second relay request for links L2 and L3 to mobile device 14 in step 205. Mobile device 11 transmits this second relay request to mobile device 14 and not to base station 19, because mobile device 11 is already having its own data, i.e. link L1, relayed via mobile device 14. Step 207 comprises the mobile device 14 receiving this second relay request.

Although the table stored by mobile device 14 already includes both links L2 and L3, mobile device 14 can accept the second relay request, because L2 and L3 are associated with a downlink device identifier of the mobile device 13 and neither L2 nor L3 is associated with the downlink device identifier "self". Mobile device 14 does not need to transmit a third relay request to base station 19, because links L2 and L3 are already associated with an uplink device identifier for base station 19/mobile communication network, which means that there is no change as far as the base station 19/mobile communication network is concerned.

In step 209, mobile device 14 therefore updates the entry for links L2 and L3 so that they are associated with a downlink device identifier for mobile device 11 instead of a downlink device identifier for mobile device 13 and transmits an acceptance message to the mobile device 11 indicating that the second relay request has been accepted.

As the mobile device 11 had no own reason to reject the relay request for links L2 and L3 and mobile device 14 is willing to relay links L2 and L3, mobile device 11 can accept the relay request from mobile device 13. Mobile device 11 therefore, after receiving the acceptance message in step 211, adds entries for links L2 and L3 to its table in step 213 and transmits a second acceptance message indicating that the first relay request has been accepted to mobile device 13 in step 215. In this entry, links L2 and L3 are associated with a downlink device identifier for mobile device 13 and an uplink device identifier for mobile device 14.

In step 217, mobile device 13 receives this acceptance message and then updates the entries for links L2 and L3 in step 219 so that they are associated with an uplink device identifier for mobile device 11 instead of an uplink device identifier for mobile device 14. The associations between link L2 and the downlink device identifier for mobile device 12 and between link L3 and the downlink device identifier "self" are not changed.

As mobile device 14 has removed the downlink device identifier for mobile device 13 from its entries for links L2 and L3, the mobile device 14 transmits a relay termination message for links L2 and L2 to mobile device 13 in step 221. The mobile device 13 receives this relay termination message in step 223, but ignores this message, because the entries for links L2 and L3 are not associated with an uplink device identifier for mobile device 14, but with an uplink device identifier for mobile device 13.

Figure 15:
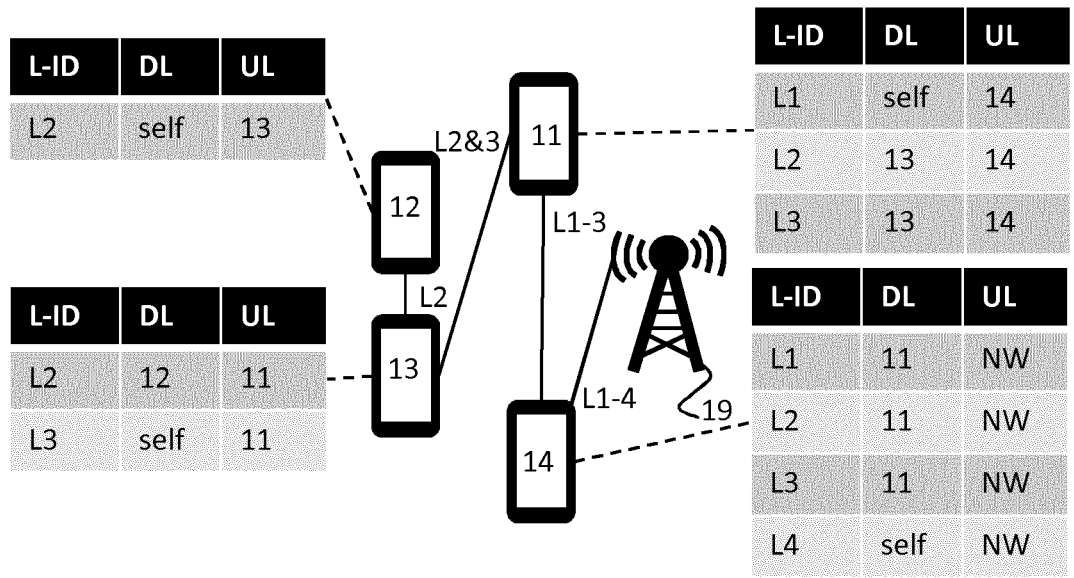
FIG. 15 helps illustrate the state of the mobile devices of FIG. 1 at a seventh moment.

The resulting tables are shown in FIG. 15. FIG. 15 also shows that the data that mobile device 13 previous relayed via mobile device 14 is now being relayed via both mobile device 11 (first) and mobile device 14 (second).

In the steps depicted in FIGS. 4,6,8,10,12 and 14, all relay requests were accepted. A situation in which a relay request would be rejected is when, at the moment and in the scenario depicted in FIG. 15, mobile device 14 would transmit a relay request for its links L1-L4 to any one of the mobile devices 11,12 and 13. Mobile device 11 would reject this relay request, because a relay request for link L1 would not be acceptable, as link L1 is associated with the downlink device identifier "self" in mobile device 11. Mobile device 12 would reject this relay request, because a relay request for link L2 would not be acceptable, as link L2 is associated with the downlink device identifier "self" in mobile device 12. Mobile device 13 would reject this relay request, because a relay request for link L3 would not be acceptable, as link L3 is associated with the downlink device identifier "self" in mobile device 13.

In case no further measures are taken, it is recommended to have a mobile device request another mobile device to relay all its links and not just a subset of its links, or at least its own link(s). Otherwise, it might be possible to create a loop. For example, if, at the moment and in the scenario depicted in FIG. 15, mobile device 14 would transmit a relay request for only link L2 to mobile device 13, mobile device 13 would accept this relay request and not even need to transmit a second relay request to mobile device 11, because link L2 is already associated with an uplink identifier of mobile device 11. Data sent by mobile device 12 over link L2 via mobile device 13 would then further be relayed via mobile device 11 and 14 and then back to mobile device 13.

If it is deemed beneficial for a mobile device to have different links relayed by different devices (e.g. mobile devices or base station), then the previously described second embodiment may be adapted. In this third embodiment, it may be indicated that a relay request is pending in the one or more link entries for the one or more links identified in the relay request when a relay request is transmitted. If a mobile device, after transmitting a relay request, receives a further relay request and this further relay request comprises a link identifier for which the table stored in the mobile device indicates that a relay request is pending, then the mobile device cannot accept the further relay request and rejects the further relay request. The mobile device then removes the indication that the one or more links have a pending relay request and keeps using the association between the link identifier and the original device identifier (i.e. not the device identifier of the device from which the relay request was received) for data forwarding. If the mobile device receives an acceptance message from the device to which it sent the relay request, then the indication that the one or more links have a pending relay request is removed and the mobile device starts using the association between the link identifier and the device identifier of the device from which relay request was received for data forwarding.

FIGS. 16 to 19 help explain the third embodiment. In this embodiment, it is not checked whether one or more of the link identifiers received in the relay request are associated with the downlink device identifier "self", but this mechanism could be added to the third embodiment.

Figure 16:
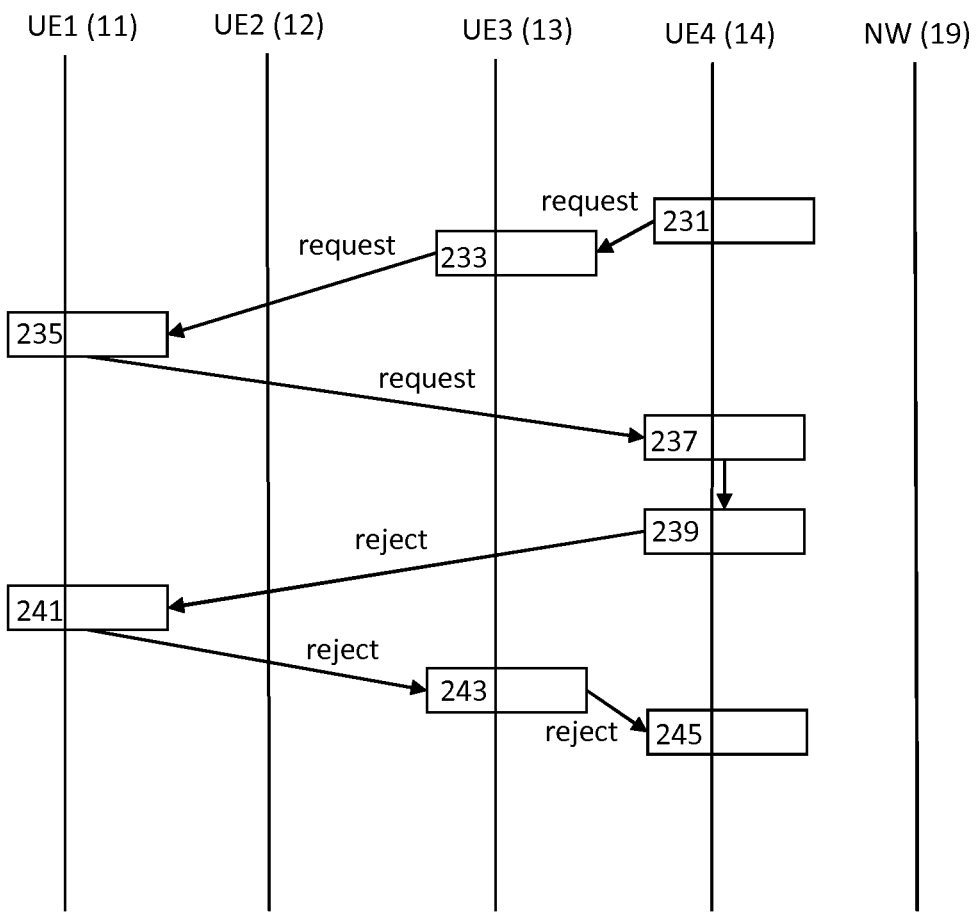
FIG. 16 is a flow diagram depicting steps of a relay request being rejected in a third embodiment of the methods of the invention.
Figure 17:
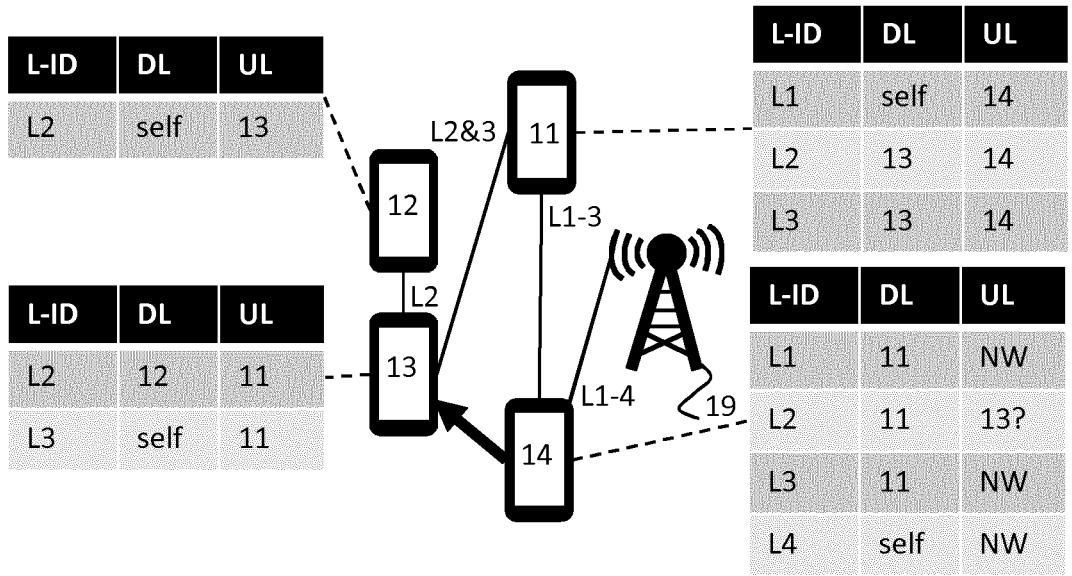
FIG. 17 helps illustrate the first step of FIG. 16.
Figure 18:
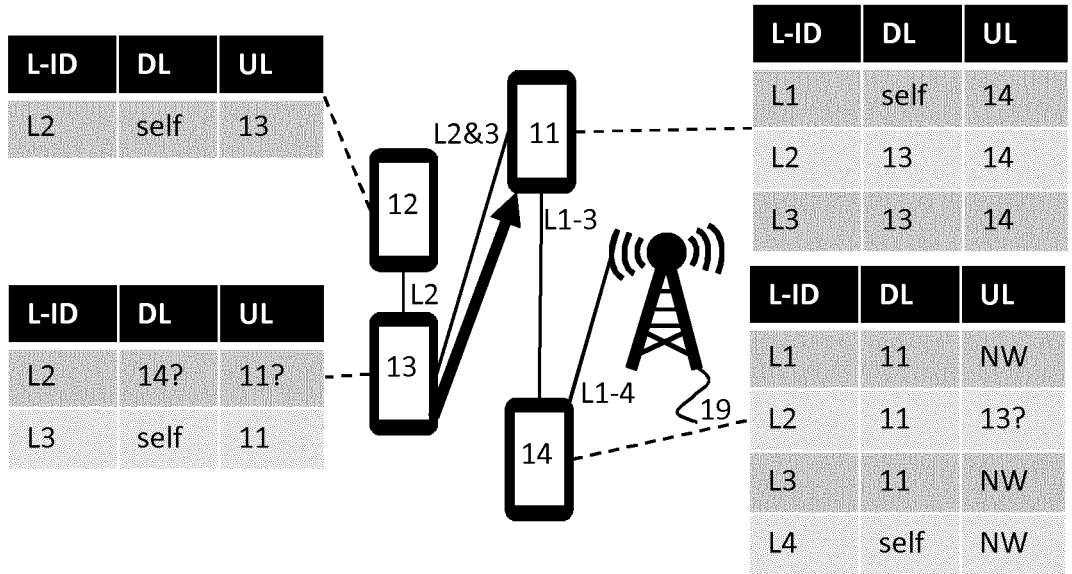
FIG. 18 helps illustrate the second step of FIG. 16.

FIG. 16 shows the steps performed by the different devices of FIG. 15 when mobile device 14 requests mobile device 13 to act as relay for link L2. In step 231, mobile device 14 transmits a relay request for link L2 to mobile device 13 and indicates in the link entry associated with link L2 (stored on mobile device 14) that a relay request is pending. This step is depicted in FIG. 17. In step 233, mobile device 13 receives this relay request, then checks whether a pending relay request is indicated for link L2 in its table and since it is not, transmits a second relay request for link L2 to mobile device 11 and indicates in the link entry associated with link L2 (stored on mobile device 13) that a relay request is pending. This step is depicted in FIG. 18.

Figure 19:
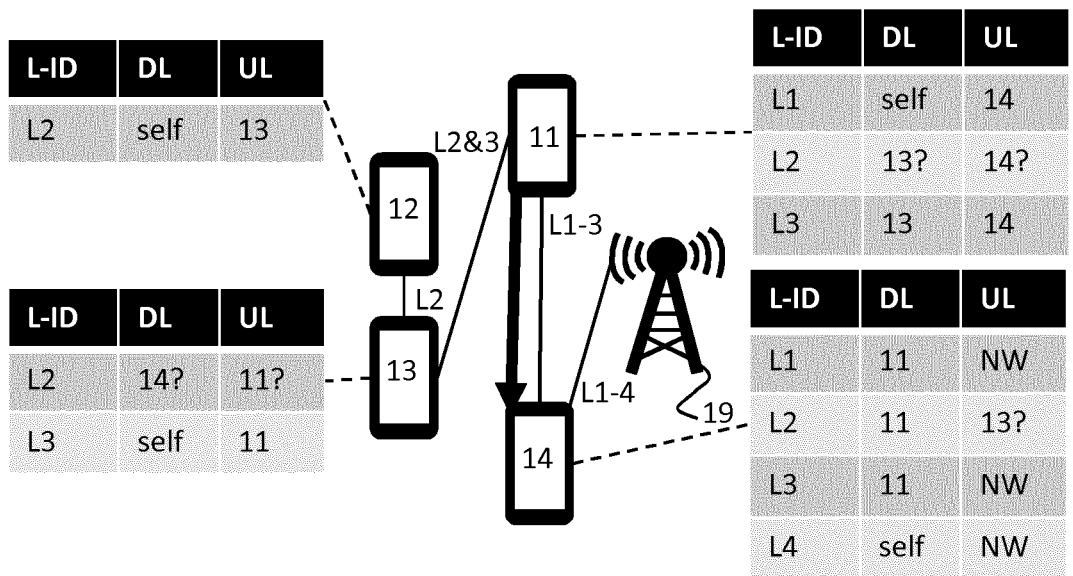
FIG. 19 helps illustrate the third step of FIG. 16.

In step 235, mobile device 11 receives this second relay request, then checks whether a pending relay request is indicated for link L2 in its table and since it is not, transmits a third relay request for link L2 to mobile device 14 and indicates in the link entry associated with link L2 (stored on mobile device 11) that a relay request is pending. This step is depicted in FIG. 19.

In step 237, mobile device 14 receives this third relay request, then checks whether a pending relay request is indicated for link L2 in its table and since it is, mobile device 14 rejects the third relay request by transmitting a rejection message (e.g. a RelayResponse message with the flag "accept" set to 0) for link L2 to mobile device 11 in step 239. In step 241, mobile device 11 receives this rejection message, looks up in its table which downlink device identifier is associated with the pending relay request for link L2: mobile device 13, and transmits a second rejection message to mobile device 13.

In step 243, mobile device 13 receives this second rejection message, looks up in its table which downlink device identifier is associated with the pending relay request for link L2: mobile device 14, and transmits a third rejection message to mobile device 14. In step 245, mobile device 14 receives this third rejection message and looks up in its table which downlink device identifier is associated with the pending relay request for link L2. Since no downlink device identifier is associated with the pending relay request for link L2, as it was the mobile device 14 itself that transmitted the first relay request, the mobile device 14 does not (need to) transmit a fourth rejection message.

In this third embodiment, after a relay request is rejected, the mobile device rejecting the relay request keeps using the original downlink and uplink device identifiers. These original downlink and uplink device identifiers may be stored in the same table, but are not shown in FIGS. 17 to 19.

In the examples of FIGS. 3 to 19, each mobile device has at most one link. However, it is also possible that a relay request is received from a mobile device that establishes an additional bearer/link next to one(s) it already has and wants to have that link relayed via the same mobile device. In this case, also the tables need to be updated to include the new link. A possible example is that a mobile device wants to set up a different QoS bearer.

Multi-hop relaying can be implemented in an LTE network in the UEs as an update to the Proximity Services framework specified in TS 23.303. The relaying requests and responses between UEs are sent as PC5 Signaling messages that trigger updates to the downlink and uplink device tables in each UE. Then, the first UE up the forwarding tree that is common to both paths will be the anchor of mobility which handles the resource release on the unused link and path switch procedure by inserting specific rules in the downlink and uplink device tables. If that unused link was a direct link this will be the eNB.

When using a direct link in LTE, a PDCP connection exists between a UE and an eNB. This layer is responsible for (re)ordering, integrity protection and ciphering of Protocol Data Units. While being relayed, the endpoints of this PDCP connection do not change and remain between each UE and the eNB. Hence, the endpoints will still be responsible for any reordering needed due to path switching.

Figure 20:
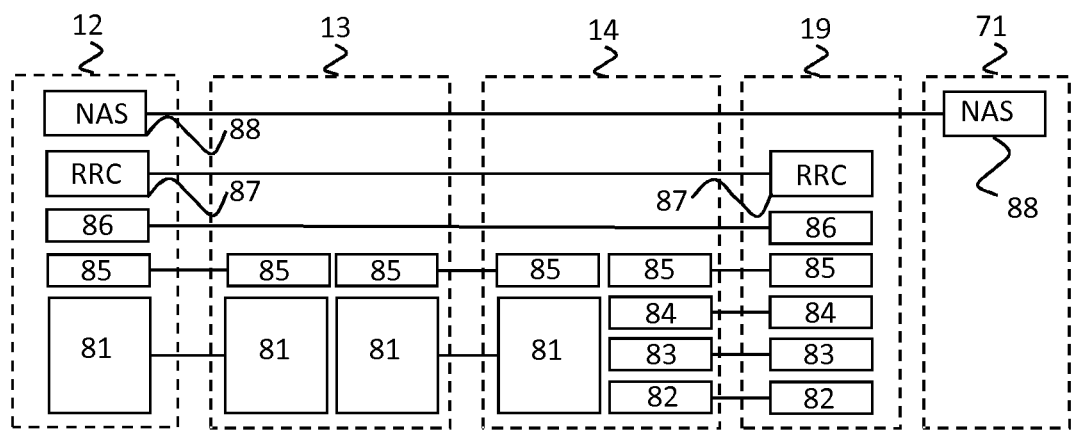
FIG. 20 depicts a control plane protocol stack used in a fourth embodiment of the methods of the invention.

This setup is possible because of the introduction of adaptation layers during the single hop relaying study by 3GPP SA2 documented in TR 23.733. They have the purpose of multiplexing traffic for different UEs on a single PC5 or Uu connection. This control plane protocol stack is depicted in FIG. 20. This invention builds on top of it by introducing tables that are present in each UE and are used to store each link's (PDCP association) forwarding behavior.

Because each UE has its own signaling context with the MME (NAS layer 88) and the eNB (the RRC layer 87) each of the UEs (relaying or not) can setup and modify bearers. This way the network has control over setting up extra bearers (radio or relay) on each UE. The devices/systems depicted in FIG. 20 are the mobile device 12-14, the base station 19 and the Mobility Management Entity (MME) 71. Other layers depicted in FIG. 20 are access link layer 81, physical (PHY) layer 82, Medium Access Control (MAC) layer 83, and Radio Link Control layer 84, adaptation layer 85, and (control plane) PDCP layer 86.

Figure 21:
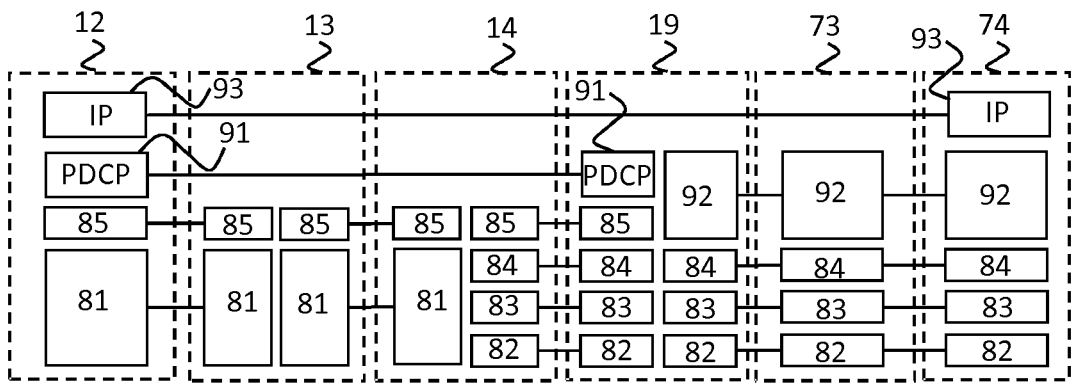
FIG. 21 depicts a user plane protocol stack used in the fourth embodiment of the methods of the invention.

The links whose identifiers are stored in the tables and included in the relay requests are PDCP links in this fourth embodiment. User data is transmitted over these PDCP links. The user plane protocol stack is depicted in FIG. 21. On top of the (data plane) PDCP layer 91, the Internet Protocol (IP) layer 93 allows data to be transmitted in IP packets. The devices/systems depicted in FIG. 21 are the mobile device 12-14, the base station 19, the Switching Gateway (SWG) 73 and the Packet Gateway (PGW) 74. Other layers depicted in FIG. 21 are access link layer 81, physical (PHY) layer 82, Medium Access Control (MAC) layer 83, and Radio Link Control layer 84, and adaptation layer 85.

Other concepts of what a link is are also possible. The main point of a link is that it is a logical connection between a UE and a node in the network. The intention is to maintain this logical link, even when the relaying configuration changes. Other concepts of links may be:
IP flow (between UE and P-GW/UPF)
PDP context (between UE and GGSN)
EPS Bearer (between UE and P-GW)

Radio Access Bearer (RAB/e-RAB) (between UE and SGSN/S-GW)

PDU Session (between UE and UPF)

Signaling association (between UE and SGSN/MME/AMF)

A central concept in the technical description is the RelayRequest message. This message could be implemented in two ways. One way would be to use the discovery methods of ProSe, namely model A and model B. The models differ in that either the client device or the relay device will announce their presence and the other will react. The RelayRequest message in this implementation could be either:

The client device announcing its presence and requesting relays by including the bearer information in the announcing message;

The response of the client device on an announcement made by the relay device. In this response message, the client device will then include the bearers it would like to have relayed.

The RelayRequest message can also be sent by the client device after it has discovered a new relay device. In that case, the implementation is a PC-5 signaling message that is exchanged after the PC-5 connection between the two UEs has been established.

Similarly, the RelayResponse message can be exchanged either as part of the discovery method (only when the client device is announcing) and can be implemented as a response to the announcement of a client device looking for a relay device. Alternatively, it can be exchanged after the RelayRequest is received after the PC-5 connection is established.

Figure 22:
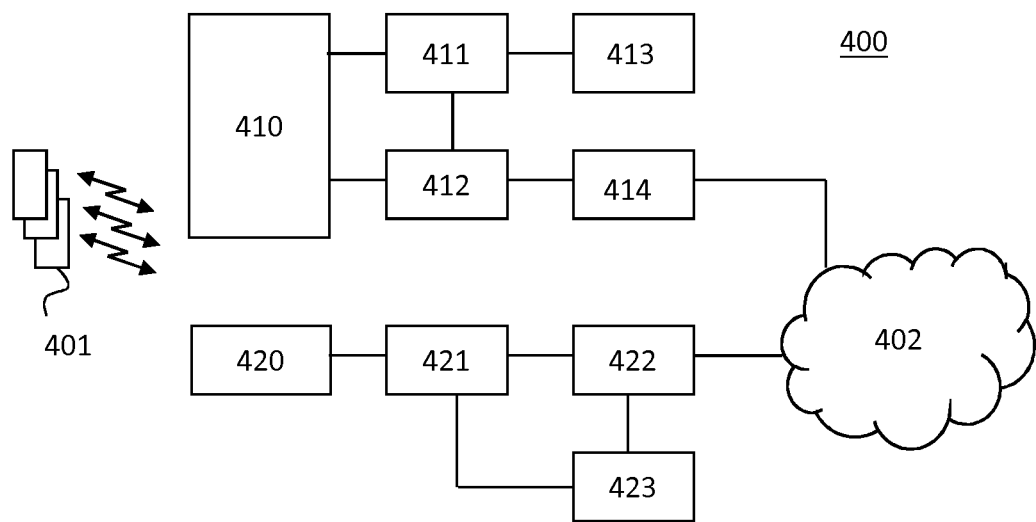
FIG. 22 is a block diagram of an exemplary cellular telecommunication system used in an embodiment of the device and the system of the invention.

In the telecommunications system 400 of FIG. 22, three generations of networks are schematically depicted together for purposes of brevity. A more detailed description of the architecture and overview can be found in 3GPP Technical Specification TS 23.002 'Network Architecture' which is included in the present application by reference in its entirety. Other types of cellular telecommunication system can alternatively or additionally be used, e.g. a 5G cellular telecommunication system.

The lower branch of FIG. 22 represents a GSM/GPRS or UMTS network.

For a GSM/GPRS network, a radio access network (RAN) system 420 comprises a plurality of nodes, including base stations (combination of a BSC and a BTS), not shown individually in FIG. 22. The core network system comprises a Gateway GPRS Support Node 422 (GGSN), a Serving GPRS Support Node 421 (SGSN, for GPRS) or Mobile Switching Centre (MSC, for GSM, not shown in FIG. 22) and a Home Location Register 423 (HLR). The HLR 423 contains subscription information for user devices 401, e.g. mobile stations MS.

For a UMTS radio access network (UTRAN), the radio access network system 420 also comprises a Radio Network Controller (RNC) connected to a plurality of base stations (NodeBs), also not shown individually in FIG. 22. In the core network system, the GGSN 422 and the SGSN 421/MSC are connected to the HLR 423 that contains subscription information of the user devices 401, e.g. user equipment UE.

The upper branch of the telecommunications system in FIG. 22 represents a 4G network, commonly indicated as Long Term Evolution (LTE) system or Evolved Packet System (EPS).

The radio access network system 410 (E-UTRAN) of the EPS, comprises base stations (evolved NodeBs, eNodeBs or eNBs), not shown individually in FIG. 22, providing cellular wireless access for a user device 401, e.g. user equipment UE. The core network system comprises a PDN Gateway (P-GW) 414 and a Serving Gateway 412 (S-GW). The E-UTRAN 410 of the EPS is connected to the S-GW 412 via a packet network. The S-GW 412 is connected to a Home Subscriber Server HSS 413 and a Mobility Management Entity MME 411 for signalling purposes. The HSS 413 includes a Subscription Profile Repository SPR for user devices 401.

For GPRS, UMTS and LTE systems, the core network system is generally connected to a further packet network 402, e.g. the Internet.

Further information of the general architecture of an EPS network can be found in 3GPP Technical Specification TS 23.401 'GPRS enhancements for Evolved Universal Terrestrial Radio Access Network (E-UTRAN) access'.

Figure 23:
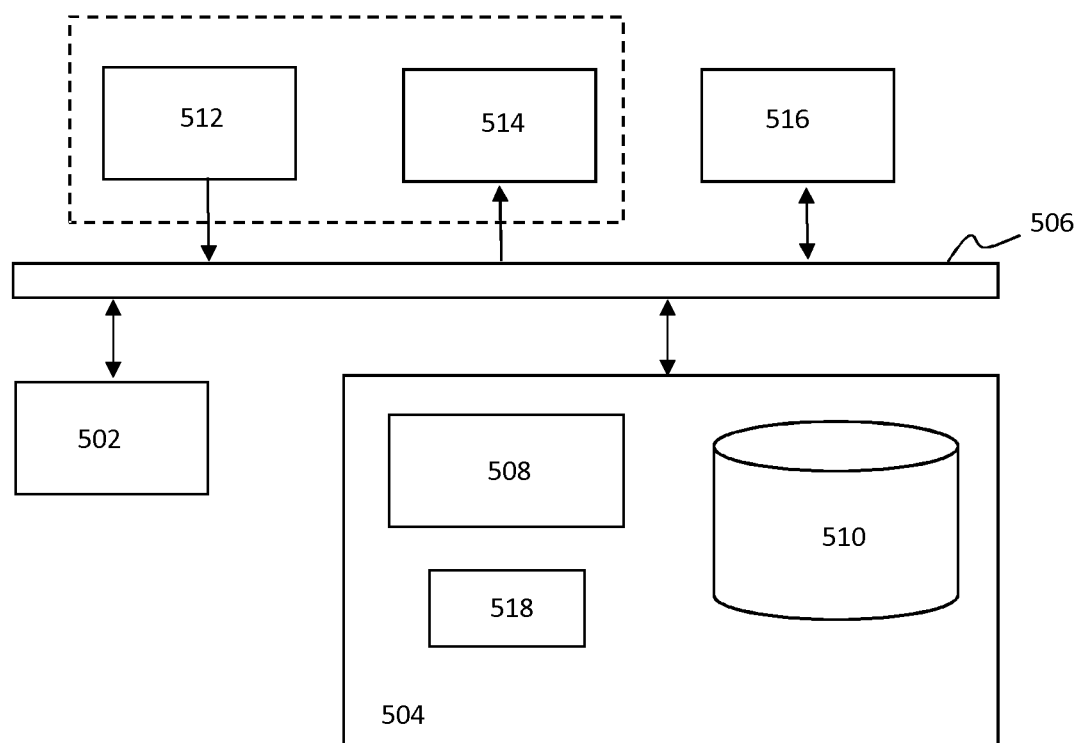
FIG. 23 is a block diagram of an exemplary data processing system for performing the methods of the invention.

FIG. 23 depicts a block diagram illustrating an exemplary data processing system that may perform the methods as described with reference to FIGS. 2,4,6,8,10,12, 14 and 16.

As shown in FIG. 23, the data processing system 500 may include at least one processor 502 coupled to memory elements 504 through a system bus 506. As such, the data processing system may store program code within memory elements 504. Further, the processor 502 may execute the program code accessed from the memory elements 504 via a system bus 506. In one aspect, the data processing system may be implemented as a computer that is suitable for storing and/or executing program code. It should be appreciated, however, that the data processing system 500 may be implemented in the form of any system including a processor and a memory that is capable of performing the functions described within this specification.

The memory elements 504 may include one or more physical memory devices such as, for example, local memory 508 and one or more bulk storage devices 510. The local memory may refer to random access memory or other non-persistent memory device(s) generally used during actual execution of the program code. A bulk storage device may be implemented as a hard drive or other persistent data storage device. The processing system 500 may also include one or more cache memories (not shown) that provide temporary storage of at least some program code in order to reduce the number of times program code must be retrieved from the bulk storage device 510 during execution.

Input/output (I/O) devices depicted as an input device 512 and an output device 514 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 23 with a dashed line surrounding the input device 512 and the output device 514). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 516 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 500, and a data transmitter for transmitting data from the data processing system 500 to said systems, devices and/or networks. Modems, cable modems, and Ethernet cards are examples of different types of network adapter that may be used with the data processing system 500.

As pictured in FIG. 23, the memory elements 504 may store an application 518. In various embodiments, the application 518 may be stored in the local memory 508, he one or more bulk storage devices 510, or separate from the local memory and the bulk storage devices. It should be appreciated that the data processing system 500 may further execute an operating system (not shown in FIG. 23) that can facilitate execution of the application 518. The application 518, being implemented in the form of executable program code, can be executed by the data processing system 500, e.g., by the processor 502. Responsive to executing the application, the data processing system 500 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 502 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A client device for transmitting a relay request, the client device comprising:
    at least one receiver;
    at least one transmitter; and
    at least one processor configured to:
    use the at least one transmitter to transmit a relay request to a relay device, the relay request comprising a first device identifier identifying the client device and one or more first link identifiers identifying one or more links, at least one of the one or more links linking a further device with a network node via the client device,
    use the at least one receiver to receive an acceptance message accepting the relay request from the relay device, and
    use the at least one transmitter to transmit data associated with the one or more links to the relay device in dependence on receipt of the acceptance message.

2. The client device as claimed in claim 1, wherein the at least one processor is further configured to associate an identifier of the relay device with each of the one or more first link identifiers in link entries stored in a memory.

3. A relay device for receiving a relay request, the relay device comprising:
    at least one receiver;
    at least one transmitter; and
    at least one processor configured to:
    use the at least one receiver to receive a relay request from a client device, the relay request comprising a first device identifier identifying the client device and one or more first link identifiers identifying one or more links, at least one of the one or more links linking a further device with a network node via the client device,
    determine whether the relay request can be accepted,
    associate the first device identifier with each of the one or more first link identifiers in link entries stored in a memory, and
    use the at least one transmitter to transmit an acceptance message accepting the relay request to the client device upon determining that the relay request can be accepted.

4. The relay device as claimed in claim 3, wherein the at least one processor is further configured to:
    use the at least one receiver to receive data comprising an individual link identifier,
    determine a device identifier associated with the individual link identifier from the link entries stored in the memory, and
    use the at least one transmitter to transmit the data to a device which identifies with the determined device identifier.

5. The relay device as claimed in claim 3 wherein the at least one processor is further configured to determine whether the relay request can be accepted by using the received one or more first link identifiers and the link entries stored in the memory to determine whether a relaying loop would be established if the relay request would be accepted.

6. The relay device as claimed in claim 5, wherein the at least one processor is further configured to determine that the relay request cannot be accepted if at least one of the received one or more first link identifiers is associated with information indicating that a link identified by the link identifier ends at the relay device.

7. The relay device as claimed in claim 6, wherein the at least one processor is further configured to transmit one or more second relay requests to a second relay device and/or a mobile communication network, the one or more second relay requests comprising a second device identifier identifying the relay device and one or more second link identifiers, the one or more second link identifiers comprising at least one of the received one or more first link identifiers.

8. The relay device as claimed in claim 7, wherein the at least one processor is further configured to indicate in one or more of the link entries that a relay request is pending, the one or more link entries being associated with the one or more second link identifiers.

9. The relay device as claimed in claim 8, wherein the at least one processor is further configured to:
use the at least one receiver to receive a third relay request from the client device or a further client device, the third relay request comprising a third device identifier and one or more third link identifiers, and
determine that the relay request cannot be accepted if at least one of the third link identifiers is indicated as having a pending relay request.

10. The relay device as claimed in claim 3, wherein the at least one processor is further configured to:
determine whether at least one of the first link identifiers is not included in the link entries stored in the memory, and
transmit one or more second relay requests to a second relay device and/or a mobile communication network if at least one of the first link identifiers is not included in the link entries, the one or more second relay requests comprising a second device identifier identifying the relay device and the at least one first link identifier.

11. The relay device as claimed in claim 10, wherein the at least one processor is further configured to associate one or more of the first link identifiers which are included in the link entries with the first device identifier without transmitting a relay request which comprises the one or more first link identifiers included in the link entries.

12. A method of transmitting a relay request, the method comprising:
transmitting a relay request to a relay device, the relay request comprising a first device identifier identifying the client device and one or more first link identifiers identifying one or more links, at least one of the one or more links linking a further device with a network node via the client device;
receiving an acceptance message accepting the relay request from the relay device; and
transmitting data associated with the one or more links to the relay device in dependence on receipt of the acceptance message.

13. A method of receiving a relay request, the method comprising:
receiving a relay request from a client device, the relay request comprising a first device identifier identifying the client device and one or more first link identifiers identifying one or more links, at least one of the one or more links linking a further device with a network node via the client device;
determining whether the relay request can be accepted;
associating the first device identifier with each of the one or more first link identifiers in link entries; and
transmitting an acceptance message accepting the relay request to the client device upon determining that the relay request can be accepted.

14. The method as claimed in claim 13, further comprising:
receiving data comprising an individual link identifier;
determining a device identifier associated with the individual link identifier from the link entries; and
transmitting the data to a device which identifies with the determined device identifier.

15. A non-transitory computer-readable medium having instructions stored thereon that, when executed by one or more processer of a client device, cause the client device to carry out operations including:
transmitting a relay request to a relay device, the relay request comprising a first device identifier identifying the client device and one or more first link identifiers identifying one or more links, at least one of the one or more links linking a further device with a network node via the client device;
receiving an acceptance message accepting the relay request from the relay device; and
transmitting data associated with the one or more links to the relay device in dependence on receipt of the acceptance message.

16. A non-transitory computer-readable medium having instructions stored thereon that, when executed by one or more processer of a relay device, cause the relay device to carry out operations including: receiving a relay request from a client device, the relay request comprising a first device identifier identifying the client device and one or more first link identifiers identifying one or more links, at least one of the one or more links linking a further device with a network node via the client device; determining whether the relay request can be accepted; associating the first device identifier with each of the one or more first link identifiers in link entries; and transmitting an acceptance message accepting the relay request to the client device upon determining that the relay request can be accepted.

* * * * *